(12) United States Patent
Olah et al.

(10) Patent No.: US 12,139,630 B2
(45) Date of Patent: Nov. 12, 2024

(54) POLYHYDROXYALKYLAMIDE MATERIALS FOR USE AS CROSSLINKERS

(71) Applicant: PPG Industries Ohio, Inc., Cleveland, OH (US)

(72) Inventors: Michael G. Olah, Pittsburgh, PA (US); William H. Retsch, Jr., Allison Park, PA (US); Hongying Zhou, Allison Park, PA (US); Debra L. Singer, Wexford, PA (US); Dennis A. Simpson, Sarver, PA (US); Tsukasa Mizuhara, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 771 days.

(21) Appl. No.: 17/413,655

(22) PCT Filed: Dec. 13, 2019

(86) PCT No.: PCT/US2019/066127
§ 371 (c)(1),
(2) Date: Jun. 14, 2021

(87) PCT Pub. No.: WO2020/123893
PCT Pub. Date: Jun. 18, 2020

(65) Prior Publication Data
US 2022/0041885 A1 Feb. 10, 2022

Related U.S. Application Data

(60) Provisional application No. 62/778,975, filed on Dec. 13, 2018.

(51) Int. Cl.
| | | |
|---|---|---|
| *C09D 133/04* | (2006.01) | |
| *C08F 220/32* | (2006.01) | |
| *C09D 7/65* | (2018.01) | |
| *C08L 33/24* | (2006.01) | |

(52) U.S. Cl.
CPC ........ *C09D 133/04* (2013.01); *C08F 220/325* (2020.02); *C09D 7/65* (2018.01); *C08L 33/24* (2013.01)

(58) Field of Classification Search
CPC ......... C09D 133/04; C09D 7/65; C08L 33/24; C08F 220/325
USPC ......................................................... 524/186
See application file for complete search history.

(56) References Cited

U.S. PATENT DOCUMENTS

| | | | |
|---|---|---|---|
| 4,727,111 A * | 2/1988 | Pettit, Jr. ................. | C08F 8/46 |
| | | | 525/934 |
| 2001/0006730 A1 | 7/2001 | Van Benthem et al. | |
| 2017/0204289 A1 | 7/2017 | Kurtz et al. | |

FOREIGN PATENT DOCUMENTS

| | | |
|---|---|---|
| WO | 2017/194464 A1 | 11/2017 |
| WO | 2021044188 A1 | 3/2021 |

* cited by examiner

*Primary Examiner* — Hui H Chin
(74) *Attorney, Agent, or Firm* — Diane R. Meyers

(57) ABSTRACT

A polyhydroxyalkylamide material having the formula (I), wherein Z represents a polymer or an alkylene, alkenylene, alkynylene or arylene group; Z' represents a bivalent organic linking group; m is 0 or 1; X represents a bivalent organic bridging group; R represents a hydroxyalkylamide group; and n is at least 2. The present invention extends to coatings compositions containing the polyhydroxyalkylamide material and articles coated with coatings derived from said coated compositions.

15 Claims, 3 Drawing Sheets

POLYHYDROXYALKYLAMIDE MATERIALS FOR USE AS CROSSLINKERS

FIELD OF THE INVENTION

The present invention relates to polyhydroxyalkylamide materials for use as crosslinkers in coating compositions. The present invention extends to coating compositions comprising the polyhydroxyalkylamide materials and to articles coated with said coating compositions. The present invention also extends to methods of preparing the polyhydroxyalkylamide materials.

BACKGROUND OF THE INVENTION

Coatings are applied to numerous substrates to provide protective and/or decorative qualities. These coatings are often thermoset coatings, which cure upon reaction of a functional resin with a crosslinking agent having functionality that reacts with the functionality of the resin. Crosslinkers are often formaldehyde based. Many industries are interested in reducing if not eliminating formaldehyde in coatings. Coatings that are substantially, essentially or completely free of formaldehyde are desired.

Known (poly)hydroxyalkylamide crosslinkers are typically small molecule crosslinkers and may be substantially insoluble in solvents. This means that such crosslinkers can typically not be used in solvent-based coating compositions. (Poly)hydroxyalkylamide crosslinkers that are substantially, essentially or completely soluble in solvents are desired.

SUMMARY OF THE INVENTION

According to the present invention there is provided a polyhydroxyalkylamide material having the formula (I):

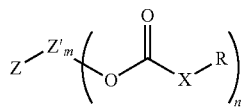

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

There is also provided a coating composition, the coating composition comprising:
a) a film-forming resin; and
b) a polyhydroxyalkylamide material having the formula (I):

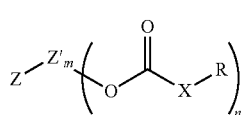

formula (I)

wherein Z represents polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

There is also provided a substrate at least partially coated with a coating, the coating being derived from a coating composition, the coating composition comprising:
a) a film-forming resin; and
b) a polyhydroxyalkylamide material having the formula (I):

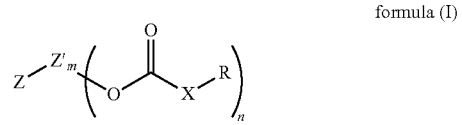

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

There is also provided a package coated on at least a portion thereof with a coating, the coating being derived from a coating composition, the coating composition comprising:
a) a film-forming resin; and
b) a polyhydroxyalkylamide material having the formula (I):

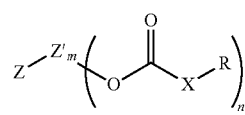

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

There is also provided a food and/or beverage package coated on at least a portion thereof with a coating, the coating being derived from a coating composition, the coating composition comprising:
a) a film-forming resin; and
b) a polyhydroxyalkylamide material having the formula (I):

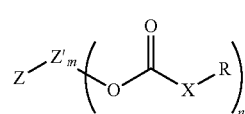

formula (I)

wherein Z represents a polymer or an alkylene, alkenylene, alkynylene or arylene group;
Z' represents a bivalent organic linking group;
m is 0 or 1;

X represents a bivalent organic bridging group;
R represents a hydroxyalkylamide group; and
n is at least 2.

There is also provided a method of preparing a polyhydroxyalkylamide material having the formula (I):

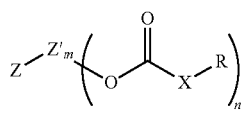

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2, the method comprising:
reacting an acrylic pre-polymer derived from monomers having ethylenic unsaturation, said acrylic pre-polymer having at least two epoxy group(s), and/or a diepoxide with the reaction product of a diacid and an alkanolamine.

There is also provided a polyhydroxyalkylamide material having the formula (I):

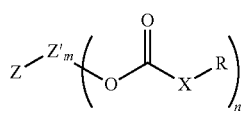

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2, the polyhydroxyalkylamide material obtainable by a method comprising:
reacting a pre-polymer having one or more epoxy group(s) and/or a diepoxide with the reaction product of a diacid and an alkanolamine.

There is also provided a coating composition, the coating composition comprising a polyhydroxyalkylamide material having the formula (I):

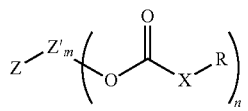

formula (I)

wherein Z represents a polymer derived from monomers having ethylenic unsaturation, and wherein Z has acid functionality;
Z' represents a bivalent organic linking group;
m is 0 or 1;
X represents a bivalent organic bridging group;
R represents a hydroxyalkylamide group; and
n is at least 2.

DETAILED DESCRIPTION OF THE INVENTION

Z represents a polymer or an alkylene, alkenylene, alkynylene or arylene group.

Z may represent a polymer. Z may represent any suitable polymer. Suitable polymers include, but are not limited to, acrylic polymers, polyester polymers, polyester amide polymers, polyurethane polymers, epoxy polymers, and combinations thereof. Z may represent an acrylic polymer, a polyester polymer or a combination thereof. Z may represent an acrylic polymer grafted to a polyester or a polyester grafted to an acrylic polymer.

Z may represent an acrylic polymer. Z may represent an acrylic polymer derived from monomers having ethylenic unsaturation.

By "derived from", and like terms, in this context is meant that the monomers from which the acrylic polymer is formed have ethylenic unsaturation when in the monomeric form. Typically, the monomers having ethylenic unsaturation are caused to polymerise via said ethylenic unsaturation, such as for example by a free radical reaction, such that the so-formed acrylic polymer has a substantially, essentially or completely saturated backbone. However, this does not exclude the possibility of the acrylic polymer having ethylenic unsaturation either in the backbone or the sidechains thereof.

The acrylic polymer may be derived from any suitable monomer(s) having ethylenic unsaturation. The acrylic polymer may be derived from one or more acrylic monomer(s). Suitable acrylic monomers will be well known to a person skilled in the art. Suitable acrylic monomers include, but are not limited to, alkyl (alk)acrylate, such as $C_1$ to $C_6$ alkyl ($C_1$ to $C_6$ alk)acrylate, for example, $C_1$ to $C_6$ alkyl (meth)acrylate, and (alk)acrylic acid, such as ($C_1$ to $C_6$ alk)acrylic acid. The acrylic monomers from which the acrylic polymer derives may comprise one or more functional group, such as an epoxy group. For example, the acrylic monomers from which the acrylic polymer derives may comprise glycidyl methacrylate.

The terms "(alk)acrylate", "(meth)acrylate" and like terms as used herein are used conventionally and herein to refer to both alkacrylate and acrylate, such as methacrylate and acrylate.

Examples of suitable acrylic monomers include, but are not limited to, acrylic acid, methacrylic acid, methyl acrylate; methyl methacrylate; ethyl acrylate; ethyl methacrylate; propyl acrylate; propyl methacrylate; butyl acrylate; butyl methacrylate, isobornyl acrylate, isobornyl methacrylate, hydroxyethyl acrylate, hydroxyethyl methacrylate, 2-ethylhexyl acrylate, 2-ethylhexyl methacrylate, glycidyl acrylate; glycidyl methacrylate; ethylene glycol diacrylate; ethylene glycol dimethacrylate; 1,6-hexanediol diacrylate; 1,6-hexanediol dimethacrylate; 4-hydroxybutyl acrylate; 4-hydroxybutyl methacrylate; allyl methacrylate; benzyl methacrylate; phosphate esters of 2-hydroxyethyl methacrylate; those sold under the trade name SIPOMER such as SIPOMER PAM-100, SIPOMER PAM-200 and SIPOMER PAM-300 (phosphate esters of polypropylene glycol monoacrylate commercially available from Solvay); and combinations thereof. Any other acrylic monomers known to those skilled in the art could also be used.

The monomers having ethylenic unsaturation may comprise glycidyl acrylate, glycidyl methacrylate or combinations thereof.

The monomers having ethylenic unsaturation may comprise glycidyl methacrylate.

The monomers having ethylenic unsaturation may comprise glycidyl methacrylate, butyl methacrylate, methyl methacrylate, butyl acrylate, hydroxyethyl methacrylate and combinations thereof.

Therefore, the acrylic polymer may be derived from monomers comprising glycidyl acrylate, glycidyl methacrylate or combinations thereof.

The acrylic polymer may be derived from monomers comprising glycidyl methacrylate.

The acrylic polymer may be derived from monomers comprising glycidyl methacrylate, butyl methacrylate, methyl methacrylate, butyl acrylate, hydroxyethyl methacrylate and combinations thereof.

Z', when present, represents a bivalent organic linking group. Z' may represent any suitable bivalent organic linking group.

Z' may represent a $C_1$ to $C_{10}$ alkylene, alkenylene, alkynylene, aralkylene or arylene group, such as a $C_1$ to $C_{10}$ alkylene group, such as a $C_1$ to $C_6$ alkylene group, such as a $C_1$ to $C_4$ alkylene group, such as a $C_2$ to $C_4$ alkylene group, such as a $C_3$ to $C_4$ alkylene group, such as $C_4$ alkylene group.

Z' may be substituted or unsubstituted. Z' may be substituted. Z' may be substituted with any suitable group. Z' may be substituted with $OR^1$, $OC(O)R^2$, $C(O)R^3$, $C(O)OR^4$, $NR^5R^6$, $C(O)N^{R}7R^8$, aryl or Het, wherein $R^1$ to $R^8$ each independently represents hydrogen, aryl or alkyl, such as hydrogen, $C_6$ to $C_{10}$ aryl or $C_1$ to $C_{10}$ alkyl, such as hydrogen, $C_6$ aryl or $C_1$ to $C_4$ alkyl. Z' may be substituted with one or more $OR^1$ group(s), wherein each $R^1$ represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen. Z' may be interrupted or uninterrupted. Z' may be interrupted. Z' may be interrupted by any suitable atom. Z' may be interrupted an oxygen atom and/or a carbonyl group.

Z' may be substituted by an oxygen atom and a carbonyl group. Z' may be substituted by an oxygen atom and a carbonyl group. Z' may be substituted by an oxygen atom and a carbonyl group.

m may be 0 or 1.

When Z represents an alkylene, alkenylene, alkynylene or arylene group, m may be 0. It will be appreciated by a person skilled in the art that when m is 0, Z may be directly attached to, i.e. directly bonded to, —OC(=O)—X—R.

When Z is a polymer, m may be 1. When Z is an acrylic polymer derived from monomers having ethylenic unsaturation, m may be 1.

m may be 1 and Z' may be substituted by an oxygen atom and a carbonyl group such that the polyhydroxyalkylamide material may be represented by the formula (II):

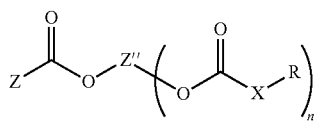

formula (II)

wherein X and n are each as defined herein;
Z represents an acrylic polymer derived from monomers having ethylenic unsaturation; and
Z" represents an alkylene, alkenylene, alkynylene, aralkylene or arylene group.

Z" may represent a $C_1$ to $C_{10}$ alkylene, alkenylene, alkynylene, aralkylene or arylene group, such as a $C_1$ to $C_{10}$ alkylene group, such as a $C_1$ to $C_6$ alkylene group, such as $C_1$ to $C_4$ alkylene group, such as a $C_1$ to $C_3$ alkylene group, such as a $C_2$ to $C_3$ alkylene group, such as a $C_3$ alkylene group. Z" may be substituted or unsubstituted. Z" may be substituted. Z" may be substituted with any suitable group. Suitable groups are as defined herein in relation to Z'. Z" may be substituted with one or more $OR^1$ group(s), wherein each $R^1$ represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen.

Z" may be a $C_3$ alkylene group. Z" may be a $C_3$ alkylene group and may be substituted with an $—OR^1$ group, wherein $R^1$ is defined as herein. Z" may be a $C_3$ alkylene group and may be substituted with an $—OR^1$ group, wherein $R^1$ is defined as herein, such that the polyhydroxyalkylamide may be represented by the formula (III):

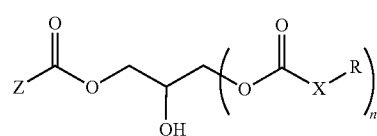

formula (III)

wherein X and R are each as defined herein; and
Z represents an acrylic polymer derived from monomers having ethylenic unsaturation.

Z may represent an alkylene, alkenylene, alkynylene or arylene group. Z may represent a $C_1$ to $C_{20}$ alkylene, alkenylene, alkynylene or arylene group, such as a $C_1$ to $C_{20}$ alkylene group, such as a $C_6$ to $C_{20}$ alkylene group, such as a $C_6$ to $C_{20}$ cyclic alkylene group, such as a $C_8$ to $C_{18}$ cyclic alkylene group, such as a $C_{10}$ to $C_{16}$ cyclic alkylene group. Z may comprise a. Z may be substituted or unsubstituted. Z may be substituted. Z may be substituted with any suitable group. Suitable groups are as defined herein in relation to Z'. Z may be substituted with an $OR^1$ group, wherein each $R^1$ represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen. Z may be interrupted or uninterrupted. Z may be interrupted. Z may be interrupted by any suitable atom. Z may be interrupted an oxygen atom and/or a carbonyl group, such as by an oxygen atom and a carbonyl group.

Z may not be interrupted by a nitrogen atom. Z may not contain an amide group.

Z may be derived from a material having one or more epoxy group(s). By "derived from", and like terms, in this context is meant that the material from which Z is derived has one or more epoxy group(s) in its free-form, i.e. before it is formed into the polyhydroxyalkylamide material. It will be appreciated by a person skilled in the art that when Z is derived from material having one or more epoxy group(s), said epoxy group(s) may or may not be present in the final polyhydroxyalkylamide material. For example, the one or more epoxy group(s) may be reacted during the formation of the polyhydroxyalkylamide material. For example, the one or more epoxy group(s) may be reacted with an acid group during the formation of the polyhydroxyalkylamide material.

Z may be derived from a polymer having at least two epoxy groups. Z may be derived from an acrylic polymer having at least two epoxy groups. When Z is derived from a polymer having at least two epoxy groups, Z may suitably be formed from one or more monomer(s) comprising an epoxy group. When Z is derived from a polymer having at least two epoxy groups, Z may comprise from 5 to 80 wt % of monomers having an epoxy group, such as from 10 to 70 wt % of monomers having an epoxy group, such as from 10 to 60 wt % of monomers having an epoxy group.

When Z is derived from an acrylic polymer having at least two epoxy groups, Z may be derived from an acrylic polymer formed from monomers comprising one or more glycidyl group(s), such as glycidyl methacrylate.

Z may be derived from a diepoxide. Z may be derived from any suitable diepoxide. Z may be derived from an aliphatic diepoxide, such as a cycloaliphatic diepoxide such as from a $C_4$ to $C_{20}$ cycloaliphatic diepoxide, such as from a $C_6$ to $C_{20}$ cycloaliphatic diepoxide. Z may be derived from (3',4'-epoxycyclohexane)methyl 3,4-epoxycyclohexylcarboxylate.

When Z is derived from a diepoxide, the diepoxide may be a commercially available diepoxide. The diepoxide may be any suitable commercially available diepoxide. Suitable commercially available diepoxides include, for example, those sold under the trade name CELLOXIDE®, such as CELLOXIDE 2021P (commercially available from DAICEL U.S.A.).

X represents a bivalent organic bridging group. X may represent any suitable bivalent organic bridging group. X may represent an alkylene, alkenylene, alkynylene, aralkylene or arylene group, such as a $C_0$ to $C_{10}$ alkylene, alkenylene, alkynylene, aralkylene or arylene group, such as a $C_0$ to $C_{10}$ alkylene or arylene group, such as a $C_0$ to $C_6$ alkylene or arylene group, such as a $C_1$ to $C_6$ alkylene or arylene group, such as a $C_1$ to $C_6$ alkylene group, such as a $C_1$ to $C_4$ alkylene group, such as a $C_1$ to $C_3$ alkylene group, such as a $C_1$ to $C_2$ alkylene group, such as ethylene. It will be appreciated by a person skilled in the art that when X is $C_0$, no linking group is present and there is a direct bond between the carbon atom of Z—O—C(=O)— and —R.

R represents a hydroxyalkylamide group. R may represent any suitable hydroxyalkylamide group. R may be according to formula (IV):

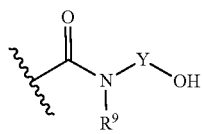

formula (IV)

wherein $R^9$ represents hydrogen, an alkyl, alkenyl, alkynyl or aryl group, or —Y—OH; and each Y independently represents an alkylene, alkenylene, alkynylene or arylene linking group.

It will be appreciated by a person skilled in the art that when R is according to formula (IV), the polyhydroxyalkylamide material may be represented by the formula (V):

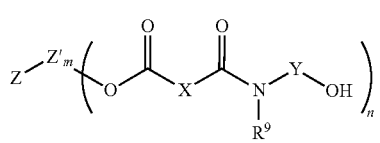

formula (V)

wherein Z, Z', X, $R^9$, m and n are each as defined herein.

$R^9$ may represent hydrogen, an alkyl group or —Y—OH, wherein each Y independently represents an alkylene linking group. $R^9$ may represent hydrogen, a $C_1$ to $C_{10}$ alkyl group or —Y—OH wherein each Y independently represents a $C_1$ to $C_{10}$ alkylene linking group. $R^9$ may represent hydrogen, a $C_1$ to $C_3$ alkyl group or —Y—OH wherein each Y independently represents a $C_1$ to $C_3$ alkylene linking group. $R^9$ may represent hydrogen, a $C_1$ to $C_2$ alkyl group or —Y—OH wherein each Y independently represents a $C_1$ to $C_2$ alkylene linking group. $R^9$ may represent hydrogen, a $C_1$ to $C_2$ alkyl group or —CH$_2$CH$_2$—OH. $R^9$ may represent hydrogen, methyl or ethyl. $R^9$ may represent hydrogen or methyl.

Y may represent ethylene.

$R^9$ may be hydrogen or methyl and Y may be ethylene. $R^9$ may be methyl and Y may be ethylene.

Thus, R may be according to formula (VI):

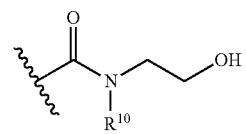

formula (VI)

wherein $R^{10}$ represents hydrogen or methyl.

When $R^9$ is a methyl group and X is an alkylene group, $R^9$ may together with one or more atom(s) of X form a cyclic group such that the polyhydroxyalkylamide material may be represented by the formula (VII):

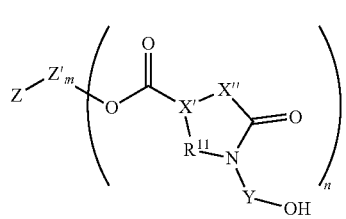

formula (VII)

wherein Z, Z', m and n are each as defined herein;

$R^{11}$ is the bivalent radical of $R^9$ and represents a methylene group;

X' is a fragment of X and represents —CR$^{11}$—, wherein $R^{11}$ represents hydrogen or a $C_1$ to $C_9$ alkyl group, such as hydrogen or a $C_1$ to $C_4$ alkyl group, such as hydrogen or a $C_1$ to $C_2$ alkyl group, such as hydrogen or methyl, such as hydrogen; and X" is the remaining fragment of X and represents a $C_0$ to $C_8$ alkylene group, such as a $C_1$ to $C_8$ alkylene group, such as a $C_1$ to $C_4$ alkylene group, such as a $C_1$ to $C_2$ alkylene group, such as a $C_1$ alkylene group.

It will be appreciated that when X" is a $C_0$ alkylene group, the so formed cyclic group will be an N-substituted β-lactam group and when X" is a $C_1$ alkylene group, the so formed cyclic group will be an N-substituted γ-lactam group, etc.

The polyhydroxyalkylamide material may be represented by the formula (VIII):

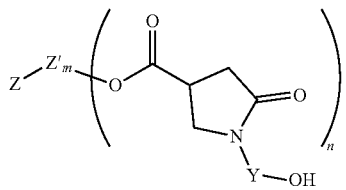

formula (VIII)

wherein Z, Z', Y, m and n are each as defined herein.

When the polyhydroxyalkylamide material is represented by formula (VIII), Y may be ethylene.

R may comprise at least one amide group.

R may comprise one amide group.

R may comprise at least two amide groups, such as two, three, four, five, six etc. amide groups. For example, the polyhydroxyalkylamide material may be represented by the formula (IX):

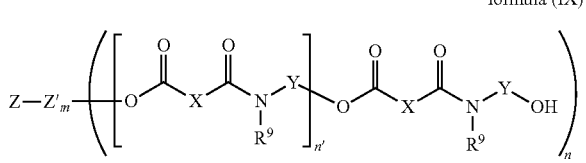

formula (IX)

wherein Z, Z' X, Y, $R^9$, m and n are each as defined herein; and n' is at least 1.

For example, the polyhydroxyalkylamide may be represented by the formula (X):

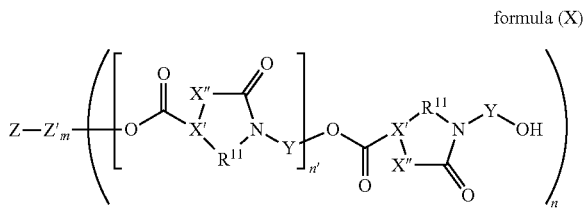

formula (X)

wherein Z, Z', X', X", Y, $R^{11}$, m and n are each as defined herein; and n' is at least 1.

n' is at least 1. n' may be from 1 to 30, such as from 1 to 20, such as from 1 to 10, such as from 1 to 5, such as 1, 2, 3, 4 or 5.

n is at least 2. When Z is a $C_1$ to $C_{20}$ alkylene, alkenylene, alkynylene or arylene group, n may be 2. When Z is a polymer, such as an acrylic polymer or even an acrylic polymer derived from monomers having ethylenic unsaturation, n may be at least 2.

The polyhydroxyalkylamide materials may have any suitable number of bridging atoms between the hydroxyalkylamide groups, R, of the polyhydroxyalkylamide materials. The polyhydroxyalkylamide material may have at least 6 bridging atoms, such as at least 8 bridging atoms, such as at least 10 bridging atoms, such as at least 15 bridging atoms, such as at least 18 bridging atoms, such as at least 20 bridging atoms, such as at least 30 bridging atoms, such as at least 40 bridging atoms, or even at least 50 bridging atoms between the hydroxyalkylamide groups, R. For the avoidance of doubt, by "bridging atoms between the hydroxyalkylamide groups", and like terms a used herein, is meant the number of atoms in the chain of atoms directly connecting two R groups (i.e. —C(=O)N($R^9$)(YOH) groups, for example) and is not intended to include any atoms branched therefrom. For example, a polyhydroxyalkylamide material according to formula (XIII) below has 19 (nineteen) bridging atoms between the hydroxyalkylamide groups.

The polyhydroxyalkylamide material may be according to formula (XI):

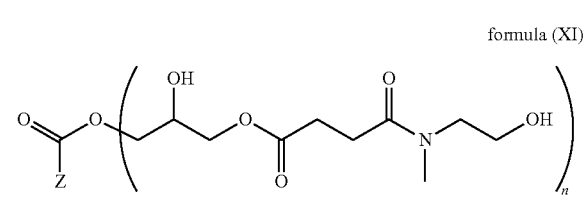

formula (XI)

wherein Z represents an acrylic polymer derived from monomers having ethylenic unsaturation; and n is at least 2.

The polyhydroxyalkylamide material may be according to formula (XII):

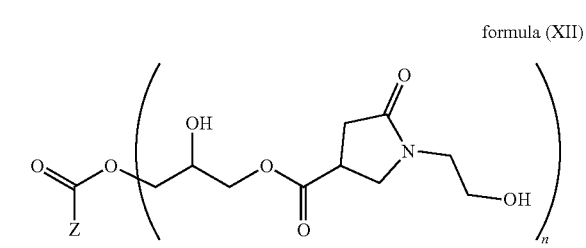

formula (XII)

wherein Z represents an acrylic polymer derived from monomers having ethylenic unsaturation; and n is at least 2.

The polyhydroxyalkylamide material may be according to formula (XIII):

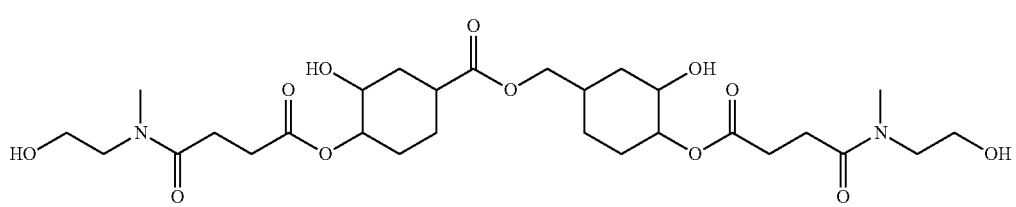

formula (XIII)

The polyhydroxyalkylamide material may have any suitable hydroxyalkylamide equivalent weight. The polyhydroxyalkylamide material may have a hydroxyalkylamide equivalent weight of at least 50 g/equivalent, such as at least 100 g/equivalent, such as at least 200 g/equivalent, such as at least 300 g/equivalent, such as at least 400 g/equivalent, such as at least 500 g/equivalent, such as at least 600 g/equivalent, or even at least 700 g/equivalent. The polyhydroxyalkylamide material may have a hydroxyalkylamide equivalent weight of up to 1000 g/equivalent. The polyhydroxyalkylamide material may have a hydroxyalkylamide equivalent weight from 50 to 1000 g/equivalent, such as from 100 to 1000 g/equivalent, such as from 200 to 1000 g/equivalent, such as from 300 to 1000 g/equivalent, such as from 400 to 1000 g/equivalent, such as from 500 to 1000 g/equivalent, such as from 600 to 1000 g/equivalent, or even from 700 to 1000 g/equivalent.

The polyhydroxyalkylamide material may have a hydroxyalkylamide equivalent weight from 50 to 200 g/equivalent.

The polyhydroxyalkylamide material may have a hydroxyalkylamide equivalent weight from 700 to 1000 g/equivalent.

The polyhydroxyalkylamide equivalent weight may be calculated by any suitable method. Suitable methods will be well known to a person skilled in the art. As reported herein, the polyhydroxyalkylamide equivalent weight may be calculated as the ratio of the weight-average molecular weight of the polyhydroxyalkylamide material to the hydroxyalkylamide equivalent number (Mw/hydroxyalkylamide equivalent number).

The hydroxyalkylamide equivalent weight is suitably expressed on solids.

The polyhydroxyalkylamide material may have any suitable weight-average molecular weight (Mw). The polyhydroxyalkylamide material may have an Mw of at least 500 Daltons (Da=g/mole), such as at least 1,000 Da, such as at least 2,000 Da, such as at least 2,500 Da, or even at least 5,000 Da. The polyhydroxyalkylamide material may have an Mw up to 250,000 Da, such as up to 100,000 Da, such as up to 50,000 Da, such as up to 25,000 Da, such as up to 15,000 Da, or even up to 10,000 Da. The polyhydroxyalkylamide material may have an Mw from 500 to 250,000 Da, such as from 1,000 to 250,000 Da, such as from 2,000 to 250,000 Da, such as from 2,500 to 250,000 Da, or even from 5,000 to 250,000 Da. The polyhydroxyalkylamide material may have an Mw from 500 to 100,000 Da, such as from 1,000 to 100,000 Da, such as from 2,000 to 100,000 Da, such as from 2,500 to 100,000 Da, or even from 5,000 to 100,000 Da. The polyhydroxyalkylamide material may have an Mw from 500 to 50,000 Da, such as from 1,000 to 50,000 Da, such as from 2,000 to 50,000 Da, such as from 2,500 to 50,000 Da, or even from 5,000 to 50,000 Da. The polyhydroxyalkylamide material may have an Mw from 500 to 25,000 Da, such as from 1,000 to 25,000 Da, such as from 2,000 to 25,000 Da, such as from 2,500 to 25,000 Da, or even from 5,000 to 25,000 Da. The polyhydroxyalkylamide material may have an Mw from 500 to 15,000 Da, such as from 1,000 to 15,000 Da, such as from 2,000 to 15,000 Da, such as from 2,500 to 15,000 Da, or even from 5,000 to 15,000 Da. The polyhydroxyalkylamide material may have an Mw from 500 to 10,000 Da, such as from 1,000 to 10,000 Da, such as from 2,000 to 10,000 Da, such as from 2,500 to 10,000 Da, or even from 5,000 to 10,000 Da.

The polyhydroxyalkylamide material may have an Mw from 2,500 to 25,000 Da, such as from 2,500 to 10,000 Da.

The weight-average molecular weight may be measured by any suitable method. Techniques to measure the weight-average molecular weight will be well known to a person skilled in the art. As reported herein, the Mw may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The polyhydroxyalkylamide material may have any suitable number-average molecular weight (Mn). The polyhydroxyalkylamide may have an Mn of at least 500 Daltons (Da=g/mole), such as at least 1,000 Da, such as at least 2,000 Da, such as at least 2,500 Da, or even at least 5,000 Da. The polyhydroxyalkylamide material may have an Mn up to 250,000 Da, such as up to 100,000 Da, such as up to 50,000 Da, such as up to 25,000 Da, such as up to 15,000 Da, or even up to 10,000 Da. The polyhydroxyalkylamide material may have an Mn from 500 to 250,000 Da, such as from 1,000 to 250,000 Da, such as from 2,000 to 250,000 Da, such as from 2,500 to 250,000 Da, or even from 5,000 to 250,000 Da. The polyhydroxyalkylamide material may have an Mn from 500 to 100,000 Da, such as from 1,000 to 100,000 Da, such as from 2,000 to 100,000 Da, such as from 2,500 to 100,000 Da, or even from 5,000 to 100,000 Da. The polyhydroxyalkylamide material may have an Mn from 500 to 50,000 Da, such as from 1,000 to 50,000 Da, such as from 2,000 to 50,000 Da, such as from 2,500 to 50,000 Da, or even from 5,000 to 50,000 Da. The polyhydroxyalkylamide material may have an Mn from 500 to 25,000 Da, such as from 1,000 to 25,000 Da, such as from 2,000 to 25,000 Da, such as from 2,500 to 25,000 Da, or even from 5,000 to 25,000 Da. The polyhydroxyalkylamide material may have an Mn from 500 to 15,000 Da, such as from 1,000 to 15,000 Da, such as from 2,000 to 15,000 Da, such as from 2,500 to 15,000 Da, or even from 5,000 to 15,000 Da. The polyhydroxyalkylamide material may have an Mn from 500 to 10,000 Da, such as from 1,000 to 10,000 Da, such as from 2,000 to 10,000 Da, such as from 2,500 to 10,000 Da, or even from 5,000 to 10,000 Da.

The polyhydroxyalkylamide material may have an Mn from 500 to 15,000 Da, such as from 500 to 10,000 Da.

A person skilled in the art will appreciate that techniques to measure the weight-average molecular weight may also be applied to measure the number-average molecular weight.

The polyhydroxyalkylamide material may have any suitable polydispersity index (PDI). The polydispersity index of a polymer is given by the ratio of Mw to Mn (Mw/Mn), wherein Mw is the weight-average molecular weight and Mn is the number average molecular weight. The polyhydroxyalkylamide material may have a polydispersity index from 1 to 20, such as from 1 to 10, such as from 1 to 5, or even from 2 to 5.

The present invention provides a coating composition, the coating composition may comprise a film-forming resin and a polyhydroxyalkylamide material as described herein.

The coating compositions may comprise a film-forming resin. The film-forming resin may be any suitable film-forming resin. Suitable examples of film-forming resins include, but are not limited to the following: polyester resins; acrylic resins; polyvinyl chloride (PVC) resins; alkyd resins; polyurethane resins; polysiloxane resins; epoxy resins or combinations thereof.

The film-forming resin may comprise a resin having acid functionality.

The film-forming resin may comprise an acrylic resin. The acrylic resin may be any suitable acrylic resin.

The film-forming resin may comprise a solution polymerised acrylic resin, an emulsion polymerised acrylic resin or a combination thereof. The film-forming resin may comprise a solution polymerised acrylic resin, an emulsion polymerised acrylic resin or a combination thereof, wherein one or both of the solution polymerised acrylic material and the emulsion polymerised acrylic latex material have acid functionality.

The film-forming resin may comprise a solution polymerised acrylic resin and an emulsion polymerised acrylic resin. The film-forming resin may comprise a solution polymerised acrylic resin and an emulsion polymerised acrylic resin, wherein one or both of the solution polymerised acrylic material and the emulsion polymerised acrylic latex material have acid functionality.

When the film-forming resin comprises a solution polymerised acrylic resin, the solution polymerised acrylic resin may be any suitable solution polymerised acrylic material. By "solution polymerised" and like terms as used herein is meant a polymer that is formed by a polymerisation method whereby one or more monomers are substantially dissolved in a solvent and polymerised. Once said monomers have been polymerised, the resultant solution polymerised acrylic material is suitably substantially soluble in said solvent. The solution polymerised acrylic material is suitably formed from one or more acrylic monomer(s). Suitable acrylic monomers are as described herein in relation to the acrylic polymer, Z.

The solution polymerised acrylic material may comprise acrylic acid, methacrylic acid, ethyl acrylate, ethyl methacrylate, butyl methacrylate, butyl acrylate or combinations thereof.

The solution polymerised acrylic material may comprise acrylic acid, methacrylic acid, butyl methacrylate, butyl acrylate or combinations thereof.

The solution polymerised acrylic material may be formed from acrylic acid, butyl methacrylate, butyl acrylate and combinations thereof.

When the solution polymerised acrylic material is formed from acrylic acid, butyl methacrylate and butyl acrylate, the acrylic acid, butyl methacrylate and butyl acrylate may be present in any suitable weight ratio. The weight ratio of acrylic acid:butyl methacrylate:butyl acrylate may be 1:1 to 10:1 to 5, suitably 1:1 to 5:1 to 3, such as 1:1 to 3:1 to 2, or even 1:1.5 to 2.5:1.5 to 2.

The solution polymerised acrylic material may comprise methacrylic acid and/or acrylic acid. The solution polymerised acrylic material may comprise any suitable amount of methacrylic acid and/or acrylic acid. The solution polymerised acrylic material may comprise from 5 to 60 wt %, such as from 10 to 50 wt %, such as from 10 to 40 wt %, such as from 10 to 30 wt %, such as from 15 to 30 wt %, or even from 15 to 25 wt % methacrylic acid and/or acrylic acid based on the total weight of the monomers.

The solution polymerised acrylic material may be formed from one or more additional ethylenically unsaturated monomer(s). Suitable additional ethylenically unsaturated monomers include, but are not limited to, aryl substituted ethylenically unsaturated monomers such as, for example, styrene; ethylenically unsaturated nitriles such as, for example, acrylonitrile or methacrylonitrile; and combinations thereof.

The solution polymerised acrylic material may be substantially free, may be essentially free or may be completely free of styrene. By substantially free in relation to styrene, is meant that the solution polymerised acrylic material is formed from monomers which comprise less than 5 wt % of styrene based on the total weight of the monomers from which the solution polymerised acrylic material is formed. By essentially free in relation to styrene, is meant that the solution polymerised acrylic material is formed from monomers which comprise less than 1 wt % of styrene based on the total weight of the monomers from which the solution polymerised acrylic material is formed. By completely free in relation to styrene, is meant that the solution polymerised acrylic material is formed from monomers which comprise less than 0.01 wt % of styrene based on the total weight of the monomers from which the solution polymerised acrylic material is formed. Suitably, solution polymerised acrylic material is formed from monomers which comprise no, i.e. 0 wt %, styrene based on the total weight of the monomers from which the solution polymerised acrylic material is formed.

The solution polymerised acrylic material is suitably formed by a solution polymerisation method. Suitable solution polymerisation methods will be well known to a person skilled in the art. The solution polymerisation method suitably comprises a plurality of components, which may be referred to as a solution polymerisation reaction mixture.

The solution polymerisation reaction mixture suitably comprises a solution polymerisation monomer component. The solution polymerisation monomer component may comprise one or more acrylic monomer(s) as described herein. The solution polymerisation monomer component may optionally comprise additional ethylenically unsaturated monomers as described herein.

The solution polymerisation reaction mixture may further comprise an initiator. The initiator may be a free radical initiator. Suitable initiators include, but are not limited to, tertiary butyl perbenzoate; tert butyl peroxy 3,5,5 trimethylhexanoate; tertiary butyl peroxy 2-ethyl hexanoate; di tertiary butyl peroxide; tertiary butyl peracetate; tertiary butyl peroctoate; azo type initiators such as, for example, 2,2'-azobis(isobutyronitrile), 2,2'-Azobis(2-methylbutyronitrile), 2,2'-Azobis(2,4-dimethyl valeronitrile) and 2,2'-Azobis(4-methoxy-2,4-dimethyl valeronitrile); persulphate initiators such as, for example, ammonium persulphate, sodium persulphate or potassium persulphate; and combinations thereof. The initiator may be soluble in the solution polymerisation reaction mixture. The initiator may be soluble in the monomer mixture.

The initiator may comprise tert butyl peroxy 3,5,5 trimethylhexanoate, tertiary butyl peroctoate or combinations thereof.

The solution polymerisation reaction mixture suitably comprises a solvent or mixture of solvents. Suitable solvents will be well known to a person skilled in the art. Examples of suitable solvents include, but are not limited to, alcohols such as, for example, n-butanol, pentanol or hexanol; glycols such as, for example, butyl glycol; glycol ethers such as, for example, 2-butoxy ethanol, 1-methoxy propan-2-ol or dipropylene glycol mono methyl ether; and combinations thereof. The solvent may comprise a mixture of solvents, such as n-butanol and butyl glycol. It will be appreciated by a person skilled in the art that the solvent or mixture of solvents is typically chosen such that the monomer mixture is substantially soluble in said solvent or mixture of solvents.

The solution polymerisation monomer component is caused to undergo polymerisation in the solvent or mixture of solvents to form the solution polymerised acrylic material. Thus, the solution polymerisation of the solution polymerisation monomer component is typically carried out as a free radical initiated solution polymerisation in a solvent or mixture of solvents.

Solution polymerisation is typically carried out in a suitable reaction vessel. The solution polymerisation monomer component, initiator and/or solvent or mixture of solvents may be added to the reaction vessel in any suitable order. For example, the solvent or mixture of solvents may be added to the reaction vessel before the solution polymerisation monomer component and/or initiator are added to the reaction vessel. The solution polymerisation monomer component and initiator may be added to the reaction vessel at the same time. The solution polymerisation monomer component and/or initiator may be added to the reaction vessel over any suitable period of time. The solution polymerisation monomer component and/or initiator may be added to the reaction vessel over a time period of 0 to 12 hours, such as 30 minutes to 8 hours, such as 1 hour to 6 hours, or even 2 hours to 4 hours. The solution polymerisation monomer component and/or initiator may be added to the reaction vessel over a time period of 3 hours. For the avoidance of doubt, when the solution polymerisation monomer component and/or initiator are added over a time period of 0 hours, all of the solution polymerisation monomer component and/or initiator are added at the same time (i.e. in one single addition).

Solution polymerisation may be carried out at any suitable temperature. Solution polymerisation may be carried out at an elevated temperature. Solution polymerisation may be carried out at a temperature from 80° C. to 200° C., suitably from 100 to 180° C., such as from 120 to 160° C., or even from 130 to 150° C. Solution polymerisation may be carried out at a temperature from 135 to 140° C. Solution polymerisation may be carried out at reflux.

The solution polymerised acrylic material suitably comprises pendant acid groups such that the solution polymerised acrylic material is acid-functional. The acid groups of the acid-functional solution polymerised acrylic material may be at least partially neutralised. The acid groups of the acid-functional solution polymerised acrylic material may be at least partially neutralised by contacting said acid-functional solution polymerised acrylic material with a neutraliser. Thus, the solution polymerised acrylic material may comprise a neutraliser. Suitable neutralisers will be well known to a person skilled in the art. Examples of suitable neutralisers include, but are not limited to tertiary amines such as, for example, dimethylethanolamine (DMEA), trimethyl amine, methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine; ammonia; hydrazine; metallic aluminium; metallic zinc; water-soluble oxides of the elements Li, Na, K, Mg, Ca, Fe(II) and Sn(II); water-soluble hydroxides of the elements Li, Na, K, Mg, Ca, Fe(II) and Sn(II); water-soluble carbonates of the elements Li, Na, K, Mg, Ca, Fe(II) and Sn(II); and combinations thereof. The neutraliser may comprise a tertiary amine. The neutraliser may comprise dimethylethanolamine (DMEA).

Any suitable amount of neutraliser may be added to the acid-functional solution polymerised acrylic material. The acid-functional solution polymerised acrylic material may be at least 10% neutralised, suitably at least 20% neutralised, such as at least 30% neutralised, such as at least 40%, or even at least 50% neutralised with the neutraliser. By, for example, 'at least 20% neutralised' is meant that at least 20% of the available acid groups of the solution polymerised acrylic material are neutralised. A person skilled in the art will therefore appreciate that at least 30%, at least 40%, at least 50% neutralised etc. means that at least 30%, at least 40%, at least 50% of the available acid groups of the solution polymerised acrylic material are neutralised. The acid-functional solution polymerised acrylic material may be 50% neutralised with the neutraliser. For example, at least 0.2, suitably at least 0.3, such as at least 0.4, or even at least 0.5 equivalents of neutraliser may be added to the solution polymerised acrylic material per equivalent of acid groups.

The solution polymerised acrylic material may be substantially dissolved and/or dispersed in water. The solution polymerised acrylic material may be substantially dissolved in water. The solution polymerised acrylic material may be substantially dissolved and/or dispersed in water before, during or after the addition of neutraliser. The solution polymerised acrylic material may be substantially dissolved and/or dispersed in water during the addition of neutraliser. Therefore, the solution polymerised acrylic material may be formed in one or more solvent and subsequently substantially dissolved and/or dispersed in water. The solution polymerised acrylic material may be formed in one or more solvent and subsequently substantially dissolved in water. The solution polymerised acrylic material has sufficient functionality such that it may be substantially dissolved in water.

When the film-forming resin comprises an emulsion polymerised acrylic latex material, the emulsion polymerised acrylic latex material may be any suitable emulsion polymerised acrylic latex material. By "emulsion polymerised" and like terms as used herein is meant a polymer that is formed by a polymerisation method which starts with an emulsion comprising, at least, water and one or more monomer(s) that are substantially insoluble in the said water. Typically, the one or more monomer(s) form an oil phase in the aqueous phase (water). The resultant emulsion polymerised acrylic latex material is in the form of a stable emulsion of polymer microparticles in the aqueous medium.

The emulsion polymerised acrylic latex material may be formed from one or more acrylic monomer(s). Suitable acrylic monomers are as described herein in relation to the acrylic polymer, Z.

The emulsion polymerised acrylic latex material may be substantially free, may be essentially free or may be completely free of styrene. Substantially free, essentially free and completely free in relation to styrene is as described herein in relation to the solution polymerised acrylic material.

The emulsion polymerised acrylic latex material may comprise acrylic acid, methacrylic acid, ethyl acrylate, ethyl methacrylate, butyl methacrylate, butyl acrylate, methyl methacrylate or combinations thereof.

The emulsion polymerised acrylic latex material may comprise acrylic acid, methacrylic acid, butyl methacrylate, butyl acrylate or combinations thereof.

The emulsion polymerised acrylic latex material may be formed from acrylic acid, butyl methacrylate, butyl acrylate, methyl methacrylate and combinations thereof.

When the emulsion polymerised acrylic latex material is formed from acrylic acid, butyl methacrylate, butyl acrylate, methyl methacrylate, the acrylic acid, butyl methacrylate, butyl acrylate, methyl methacrylate may be present in any suitable weight ratio. The weight ratio of acrylic acid:butyl methacrylate:butyl acrylate:methyl methacrylate may be 1:2 to 10:1 to 5:1 to 4, suitably 1:2 to 6:1 to 4:1 to 3, such as 1:3 to 5:2 to 4:1 to 3. Suitably, the weight ratio of acrylic acid:butyl methacrylate:butyl acrylate:methyl methacrylate may be 1:4:3:2.

The emulsion polymerised acrylic latex material may comprise methacrylic acid. The emulsion polymerised acrylic latex material may comprise any suitable amount of methacrylic acid. The emulsion polymerised acrylic latex material may comprise from 1 to 50 wt %, such as from 5 to 40 wt %, such as from 5 to 30 wt %, such as from 10 to 30 wt %, or even from 10 to 20 wt % methacrylic acid based on the total weight of the monomers.

The emulsion polymerised acrylic latex material may comprise acrylic acid. The emulsion polymerised acrylic latex material may comprise any suitable amount of acrylic acid. The emulsion polymerised acrylic latex material may comprise from 1 to 50 wt %, such as from 1 to 40 wt %, such as from 1 to 30 wt %, such as from 1 to 20 wt %, or even from 1 to 10 wt % methacrylic acid based on the total weight of the monomers.

The emulsion polymerised acrylic latex material comprises acrylic acid and/or methacrylic acid. The emulsion polymerised acrylic latex material comprises acrylic acid and methacrylic acid. The emulsion polymerised acrylic latex material comprises acrylic acid and methacrylic acid in the amounts defined herein.

The emulsion polymerised acrylic latex material may be formed from one or more additional ethylenically unsaturated monomer(s). Suitable additional ethylenically unsaturated monomer(s) are as described herein in relation to the solution polymerised acrylic material.

The emulsion polymerised acrylic latex material may comprise an aqueous dispersion of said emulsion polymerised acrylic latex material.

The emulsion polymerised acrylic latex material is suitably formed by an emulsion polymerisation method. Suitable emulsion polymerisation methods will be well known to a person skilled in the art. The emulsion polymerisation method suitably comprises a plurality of components, which may be referred to as an emulsion polymerisation reaction mixture.

The emulsion polymerisation reaction mixture suitably comprises an emulsion polymerisation monomer component. The emulsion polymerisation monomer component may comprise one or more acrylic monomer(s) as described herein. The emulsion polymerisation monomer component may optionally comprise additional ethylenically unsaturated monomers as described herein. The emulsion polymerisation monomer component of the emulsion polymerisation reaction mixture may be the same or different to the solution polymerisation monomer component of the solution polymerisation reaction mixture. The monomer component of the emulsion polymerisation reaction mixture may be different to the monomer component of the solution polymerisation reaction mixture.

The emulsion polymerisation monomer component may be substantially hydrophobic. For example, the emulsion polymerisation monomer component may have a partition coefficient of at least 1 (one), suitably at least 1.25, such as at least 1.5, such as at least 2, or even at least 2.5. It will be appreciated by a person skilled in the art that it is the emulsion polymerisation monomer component overall and not each individual monomer present in the emulsion polymerisation monomer component that should have a partition coefficient of at least 1 (one).

The emulsion polymerisation reaction mixture may further comprise an initiator. Suitable initiators are as described herein in relation to the solution polymerised acrylic material. Suitably, the initiator may comprise ammonium persulphate, hydrogen peroxide, benzoin or combinations thereof.

The initiator may comprise ammonium persulphate, hydrogen peroxide and benzoin.

The emulsion polymerisation reaction mixture may comprise any suitable amount of ammonium persulphate. The emulsion polymerisation reaction mixture may comprise from 0.01 to 1 wt %, such as from 0.05 to 0.75 wt %, such as from 0.1 to 0.5 wt %, or even from 0.1 to 0.25 wt % ammonium persulphate based on the total weight of the monomers.

The emulsion polymerisation reaction mixture may comprise from 0.4 to 0.5 wt % ammonium persulphate based on the total weight of the monomers.

The emulsion polymerisation reaction mixture may comprise from 0.15 to 0.25 wt %, such as from 0.18 to 0.22 wt %, such as 0.2 wt % ammonium persulphate based on the total weight of the monomers. The emulsion polymerisation reaction mixture may comprise from 0.15 to 0.25 wt %, such as from 0.18 to 0.22 wt %, such as 0.2 wt % ammonium persulphate based on the total weight of the monomers, when the initiator comprises ammonium persulphate, hydrogen peroxide and benzoin.

The emulsion polymerisation reaction mixture suitably comprises water.

The monomer component of the emulsion polymerisation reaction mixture is suitably caused to undergo polymerisation in the water to form the emulsion polymerised acrylic latex material. Thus, the polymerisation of the monomer component of the emulsion polymerisation reaction mixture is typically carried out as a free radical initiated emulsion polymerisation in water. The monomer component of the emulsion polymerisation reaction mixture suitably forms an oil phase in the water.

The emulsion polymerisation reaction mixture may comprise a buffer. Suitable buffers will be well known to a person skilled in the art. The buffer may be operable to act as a hydrogen ion acceptor. Examples of suitable buffers include, but are not limited to sodium bicarbonate.

The emulsion polymerisation reaction mixture may comprise a surfactant. The surfactant may be an anionic, cationic or non-ionic type stabilizer. Suitable examples of anionic surfactants include, but are not limited to, alkyl sulphates such as, for example, sodium dodecyl sulphate or sodium polyoxy ethylene alkyl ether sulphate; aryl sulphonates such as, for example, sodium dodecylbenzene sulphonate; sulphosuccinates such as, for example, sodium diisobutyl sulpho succinate, sodium dioctyl sulpho succinate and sodium di cyclohexyl sulpho succinate; and combinations thereof. Suitable examples of nonionic emulsifiers include, but are not limited to, fatty alcohol ethoxylates such as, for example polyethylene glycol mono lauryl ether; fatty acid ethoxylates such as, for example, polyethylene glycol mono stearate or polyethylene glycol mono laurate; polyether block polymers such as, for example, polyethylene glycol/polypropylene glycol block polymers also known as pluronics, typical commercial products of this type include Tergitol® XJ, XH or XD commercially available from Dow Chemical; and combinations thereof. Suitable examples of cationic emulsifiers include, but are not limited to, amine salts such as, for example, cetyl trimethyl ammonium chloride or benzyl dodecyl dimethyl ammonium bromide; and combinations thereof. It will be appreciated by a person skilled in the art that mixtures of anionic and cationic emulsifiers would typically not be desirable.

The surfactant may be polymeric. The surfactant may be polymerisable with the emulsion polymerised acrylic latex material. For example, the surfactant may be polymerisable with the monomers that form the emulsion polymerised acrylic latex material.

The emulsion polymerisation reaction mixture may be substantially free, may be essentially free or may be completely free of surfactant. By substantially free in relation to surfactants, is meant that the emulsion polymerisation reaction mixture comprises less than 5 wt % of surfactant based on the total weight of the emulsion polymerisation reaction mixture. By essentially free in relation to surfactants, is meant that the emulsion polymerisation reaction mixture comprises less than 1 wt % of surfactant based on the total weight of the emulsion polymerisation reaction mixture. By completely free in relation to surfactants, is meant that the emulsion polymerisation reaction mixture comprises less than 0.01 wt % of surfactant based on the total weight of the emulsion polymerisation reaction mixture. Suitably, emulsion polymerisation reaction mixture comprises no, i.e. 0 wt %, surfactant.

The emulsion polymerisation reaction mixture may comprise a neutraliser. Suitable neutralisers are as described herein in relation to the solution polymerised acrylic material. A neutraliser may be added to at least of portion of the emulsion polymerisation monomer component. A neutraliser may be added to at least a portion of the emulsion polymerisation monomer component prior to the polymerisation reaction, i.e. prior to the emulsion polymerisation monomer component contacting the initiator.

Emulsion polymerisation is typically carried out in a suitable reaction vessel. The emulsion polymerisation monomer component, initiator and/or water of the emulsion polymerisation reaction mixture may be added to the reaction vessel in any suitable order. For example, the water may be added to the reaction vessel before the emulsion polymerisation monomer component and/or initiator are added to the reaction vessel. The initiator is added to the reaction vessel before the emulsion polymerisation monomer component. The emulsion polymerisation monomer component and/or initiator may be added to the reaction vessel over any suitable period of time. The emulsion polymerisation monomer component and/or initiator may be added to the reaction vessel over a time period of from 0 to 24 hours, such as from 30 minutes to 12 hours, such as from 1 hour to 10 hours, such as from 2 hours to 10 hours, or even from 2 to 6 hours. The emulsion polymerisation monomer component and/or initiator may be added to the reaction vessel over a time period of 3 to 5 hours. The emulsion polymerisation monomer component and/or initiator may be added to the reaction vessel over a time period of 4 to 5 hours. For the avoidance of doubt, when the emulsion polymerisation monomer component and/or initiator are added over a time period of 0 hours, all of the emulsion polymerisation monomer component and/or initiator are added at the same time (i.e. in a single addition).

The emulsion polymerisation monomer component may be added to the reaction vessel over a time period of 1 to 24 hours, suitably from 1 to 12 hours, such as from 2 to 10 hours, or even from 2 to 6 hours. The emulsion polymerisation monomer component may be added to the reaction vessel over a time period of 4 to 5 hours.

The emulsion polymerisation monomer component may be added at any suitable rate during the time period for addition of the emulsion polymerisation monomer component. The emulsion polymerisation monomer component may be added at a constant rate or the emulsion polymerisation monomer component may be added at a variable rate during the time period for addition of the emulsion polymerisation monomer component. The emulsion polymerisation monomer component may be added dropwise. By the term 'dropwise' and like terms as used herein is meant, unless specified otherwise, that the emulsion polymerisation monomer component is added at a rate of from 0.05 to 1.0 wt %/minute over a period of time, T, based on the total solid weight of the monomers in the emulsion polymerisation monomer component.

The monomer component may be added at a variable rate during the time period for addition of the monomer component.

The emulsion polymerised acrylic latex material may be obtainable by a method comprising the steps of:
i) adding an initiator to an aqueous carrier to form an aqueous initiator mixture;
ii) adding a monomer component comprising one or more acrylic monomer(s) to the aqueous initiator mixture of step a) to form an aqueous dispersion; and
iii) polymerising the aqueous dispersion to form an emulsion polymerised acrylic latex material, wherein the monomer component has a partition coefficient of at least 1.

The emulsion polymerised acrylic latex material may be obtainable by a method comprising the steps of:
i) adding an initiator to an aqueous carrier to form an aqueous initiator mixture;
ii) adding a monomer component comprising one or more acrylic monomer(s) to the aqueous initiator mixture of step a) to form an aqueous dispersion; and
iii) polymerising the aqueous dispersion to form an emulsion polymerised acrylic latex material,
wherein the monomer component is added to the aqueous initiator mixture of step a) over a time period, T, of 1 to 24 hours.

The time period, T, is from 1 to 24 hours. The time period, T, may be from 1 to 12 hours, such as from 2 to 10 hours, such as from 2 to 6 hours, or even from 4 to 5 hours. The time period, T, is at least 1 hour. The time period, T, may be at least 2 hours, such as at least 4 hours. The time period, T, is up to 24 hours. The time period, T, may be up to 12 hours, such as up to 10 hours, such as up to 6 hours, or even up to 5 hours. The time period, T, is from 1 to 24 hours. The time period, T, may be from 1 to 12 hours, such as from 1 to 10 hours, such as from 1 to 6 hours, or even from 1 to 5 hours. The time period, T, may be from 2 to 12 hours, such as from 2 to 10 hours, such as from 2 to 6 hours, or even from 2 to 5 hours. The time period, T, may be from 4 to 12 hours, such as from 4 to 10 hours, such as from 4 to 6 hours, or even from 4 to 5 hours.

The monomer component may be added at a variable rate during the time period for addition of the monomer component. The monomer component may be added at a slower rate initially and then at an increasingly faster rate during the time period for addition of the monomer component. For example, the monomer component may initially be added at a rate of from 0.05 to 0.50 wt %/minute, such as from 0.1 to 0.25 wt %/minute, such as from 0.1 to 0.2 wt %/minute, or even from 0.15 to 0.2 wt %/minute based on the total solid weight of the monomers in the monomer component. The monomer component may subsequently be added at a rate of from 0.1 to 1 wt %/minute, such as from 0.2 to 0.5 wt %/minute, such as from 0.2 to 0.4 wt %/minute, or even from 0.3 to 0.4 wt %/minute based on the total solid weight of the monomers in the monomer component. The monomer component may subsequently be added at a rate of from 0.2 to 2 wt %/minute, such as from 0.4 to 1.0 wt %/minute, such as from 0.4 to 0.8 wt %/minute, or even from 0.5 to 0.8 wt %/minute based on the total solid weight of the monomers in the monomer component. For example, the monomer component may initially be added at a rate of from 0.05 to 0.50 wt %/minute, such as from 0.1 to 0.25 wt %/minute, such as from 0.1 to 0.2 wt %/minute, or even from 0.15 to 0.2 wt %/minute based on the total solid weight of the monomers in the monomer component for a time period from 1 minute to 3 hours, such as from 15 minutes to 2 hours, such as from 30 minutes to 90 minutes, or even for a time period of 1 hour. The monomer component may subsequently be added at a rate of from 0.1 to 1 wt %/minute, such as from 0.2 to 0.5 wt %/minute, such as from 0.2 to 0.4 wt %/minute, or even from 0.3 to 0.4 wt %/minute based on the total solid weight of the monomers in the monomer component for a time period from 1 minute to 3 hours, such as from 15 minutes to 2 hours, such as from 30 minutes to 90 minutes, or even for a time period of 1 hour. The monomer component may subsequently be added at a rate of from 0.2 to 2 wt %/minute, such as from 0.4 to 1.0 wt %/minute, such as from 0.4 to 0.8 wt %/minute, or even from 0.5 to 0.8 wt %/minute based on the total solid weight of the monomers in the monomer component for a time period from 1 minutes to 6 hours, suitably from 30 minutes to 4 hours, such as from 1 hour to 3 hours, or even for a time period of 2 hours.

Emulsion polymerisation may be carried out at any suitable temperature. Emulsion polymerisation may be carried out at a temperature from 20° C. to 150° C., suitably from 40 to 120° C., such as from 50 to 100° C., such as from 60 to 95° C., or even from 70 to 90° C. Emulsion polymerisation may be carried out at a temperature of 80° C. The temperature is typically held constant throughout the emulsion polymerisation process.

The emulsion polymerised acrylic latex material may comprise pendant acid groups such that the emulsion polymerised acrylic latex material is acid-functional. The acid groups of the acid-functional emulsion polymerised acrylic latex material may be at least partially neutralised. The acid groups of the acid-functional emulsion polymerised acrylic latex material may be at least partially neutralised by contacting said acid-functional emulsion polymerised acrylic latex material with a neutraliser. Thus, the emulsion polymerised acrylic latex material may comprise a neutraliser. Suitable neutralisers are as described herein in relation to the solution polymerised acrylic material. Suitably, the neutraliser may comprise a tertiary amine. The neutraliser may comprise dimethylethanolamine (DMEA).

Any suitable amount of neutraliser may be added to the acid-functional emulsion polymerised acrylic latex material. The acid-functional emulsion polymerised acrylic latex material may be at least 10% neutralised, such as at least 20% neutralised, such as at least 30% neutralised, such as at least 40%, or even at least 50% neutralised with the neutraliser. By, for example, 'at least 20% neutralised' is meant that at least 20% of the available acid groups of the acid-functional emulsion polymerised acrylic latex material are neutralised. A person skilled in the art will therefore appreciate that at least 30%, at least 40%, at least 50% neutralised etc. means that at least 30%, at least 40%, at least 50% of the available acid groups of the acid-functional emulsion polymerised acrylic latex material are neutralised. The acid-functional emulsion polymerised acrylic latex material may be 50% neutralised with the neutraliser. For example, at least 0.2, suitably at least 0.3, such as at least 0.4, or even at least 0.5 equivalents of neutraliser may be added to the emulsion polymerised acrylic latex material per equivalent of acid groups.

The emulsion polymerised acrylic latex material may be in a core/shell arrangement.

The shell may be formed from a plurality of components, which may be referred to as a shell mixture. The shell mixture may comprise one or more acrylic monomer(s) as described herein. The emulsion polymerisation reaction mixture may optionally comprise additional ethylenically unsaturated monomers as described herein.

The shell mixture may further comprise one or more initiator(s). Suitable initiators are as described herein in relation to the solution polymerised acrylic material.

The shell mixture is caused to undergo polymerisation to form a shell polymer. The polymerisation of the shell mixture is typically carried out as a free radical initiated solution polymerisation in a solvent or mixture of solvents. The solvents which may be used in this process include, but are not limited to, alcohols such as n-butanol, pentanol or hexanol; or glycol ethers such as 2-butoxy ethanol, 1-methoxy propan-2-ol or dipropylene glycol mono methyl ether. Polymerisation may be carried out at an elevated temperature. The polymerisation may be carried out in the range 80° C. to 150° C. The polymerisation can be effectively carried out by adding the shell mixture, over a set time period, to the solvent mixture. The shell mixture may be caused to undergo polymerisation to form a shell polymer prior to contact with components of the core mixture.

Where the shell mixture comprises one or more α,β-ethylenically unsaturated carboxylic acid, the shell polymer will have pendant carboxylic acid functional groups. This may be referred to a carboxylic acid functional shell polymer.

The carboxylic acid functional shell polymer may be contacted with a base to form a water dispersible salt. The carboxylic acid functionality in the carboxylic acid functional shell polymer may be at least partly neutralised with the base. Typically at least 10% of the available carboxylic acid groups are neutralised. Substantially all of the available carboxylic acid groups may be neutralised by the base. The base used for this neutralisation may comprises an amine functional material, or a mixture of amine functional materials. Examples of suitable amine functional materials include ammonia, triethylamine, diethylamine, trimethylamine and morpholine or hydroxy amine materials such as ethanol amine, N-methyl ethanol amine and N,N di methyl ethanolamine.

The shell polymer may be dispersed in aqueous medium. In this manner, an aqueous dispersion or solution of the shell polymer may be formed.

The shell mixture may be caused to undergo polymerisation to form a shell polymer by emulsion polymerisation in an aqueous medium, thereby forming an aqueous dispersion or solution of the shell polymer.

The core may be formed from plurality of components, which may be referred to as a core mixture. The core mixture comprises one or more acrylic monomer(s) as described herein. The emulsion polymerisation reaction mixture may optionally comprise additional ethylenically unsaturated monomers as described herein.

The polymer formed from the shell mixture, such as an aqueous dispersion thereof, may serve as a dispersant for a subsequent polymerisation, which may be a polymerisation of an α,β-ethylenically unsaturated monomer mixture, such as the core mixture.

The core mixture may further comprise one or more one or more initiator(s). Suitable initiators are as described herein in relation to the solution polymerised acrylic material.

The core mixture may be caused to undergo polymerisation at a temperature in the range from 30° C. to 99° C., suitably in the range from 50° C. to 95° C., such as in the range from about 80° C. to 90° C. Polymerisation of the core mixture may occur in the presence of the polymer formed by polymerisation of the shell mixture to thereby form a core/shell polymer, such as by emulsion polymerisation. A typical polymerisation may be carried out by adding the core mixture, at a controlled rate over a period of time, to an aqueous dispersion of shell polymer. During the polymerisation the mixture may be mixed, such as by stirring and the temperature may be held generally constant.

Other methods to polymerise the core mixture include, but are not limited to, mixing all or part of the core ethylenically unsaturated substances with the aqueous dispersion of shell polymer and then adding the remaining core components, including initiator, to the resulting mixture over a set period of time. Suitable temperatures for this type of process are typically in the range 50° C. to 95° C.

For the core/shell latex composition the ratio of the core mixture (monomers and initiator) to shell mixture (monomers and initiator) may be from about 20:80 to 90:10 by weight. The ratio of the core mixture to shell mixture may be from 60:40 to 80:20 by weight, such as from 70:30 to 75:25 by weight.

The coating compositions may comprise any suitable amount of solution polymerised acrylic material, when present. The coating compositions may comprise from 0.5 to 90 wt %, such as from 1 to 75 wt %, such as from 1 to 50 wt %, such as from 2 to 40 wt %, such as from 5 to 20 wt %, such as from 5 to 15 wt % of solution polymerised acrylic material based on the total solid weight of the coating composition. The coating composition may comprise 10 wt % of solution polymerised acrylic material based on the total solid weight of the coating composition.

The coating compositions may comprise any suitable amount of emulsion polymerised acrylic latex material, when present. The coating compositions may comprise from 1 to 99 wt %, suitably from 10 to 95 wt %, such as from 20 to 90 wt %, such as from 50 to 90 wt %, such as from 60 to 90 wt %, such as from 70 to 90 wt %. or even from 80 to 90 wt % of emulsion polymerised acrylic latex material based on the total solid weight of the coating composition.

The present invention also provides a coating composition comprising a polyhydroxyalkylamide material according to formula (I) as described herein, wherein Z represents a polymer derived from monomers having ethylenic unsaturation and wherein Z has acid functionality.

When Z represents a polymer derived from monomers having ethylenic unsaturation and has acid functionality, the polyhydroxyalkylamide materials may be self-curing. By "self-curing", and like terms, as used herein is meant that the polyhydroxyalkylamide materials are capable of acting as a film forming resin by crosslinking with themselves. For example, the hydroxyalkylamide groups of the polyhydroxyalkylamide materials may react with the acid functionality of the polyhydroxyalkylamide materials. When Z represents a polymer derived from monomers having ethylenic unsaturation and has acid functionality, the coating compositions may not comprise a further film-forming resin, for example, because the coating compositions may not require a further film-forming resin in order to form a cured film.

The coating compositions comprise a polyhydroxyalkylamide material as described herein.

The coating compositions may comprise any suitable amount of polyhydroxyalkylamide material. The coating compositions may comprise from 0.5 to 60 wt %, such as from 1 to 40 wt %, such as from 1 to 30 wt %, such as from 1 to 20 wt %, such as from 1 to 10 wt %, such as from 1.5 to 8 wt %, or even from 2 to 6 wt % polyhydroxyalkylamide material based on the total solid weight of the coating composition. The coating compositions may comprise from 0.5 to 60 wt %, such as from 1 to 60 wt %, such as from 1.5 to 60 wt %, or even from 2 to 60 wt % polyhydroxyalkylamide material based on the total solid weight of the coating composition. The coating compositions may comprise from 0.5 to 50 wt %, such as from 1 to 50 wt %, such as from 1.5 to 50 wt %, or even from 2 to 50 wt % polyhydroxyalkylamide material based on the total solid weight of the coating composition. The coating composition may comprise from 0.5 to 40 wt %, such as from 1 to 40 wt %, such as from 1.5 to 40 wt %, or even from 2 to 40 wt % polyhydroxyalkylamide material based on the total solid weight of the coating composition. The coating composition may comprise from 0.5 to 30 wt %, such as from 1 to 30 wt %, such as from 1.5 to 30 wt %, or even from 2 to 30 wt % polyhydroxyalkylamide material based on the total solid weight of the coating composition. The coating composition may comprise from 0.5 to 20 wt %, such as from 1 to 20 wt %, such as from 1.5 to 20 wt %, or even from 2 to 20 wt % polyhydroxyalkylamide material based on the total solid weight of the coating composition. The coating composition may comprise from 0.5 to 10 wt %, such as from 1 to 10 wt %, such as from 1.5 to 10 wt %, or even from 2 to 10 wt % polyhydroxyalkylamide material based on the total solid weight of the coating composition. The coating composition may comprise from 0.5 to 8 wt %, such as from 1 to 8 wt %, such as from 1.5 to 8 wt %, or even from 2 to 8 wt % polyhydroxyalkylamide material based on the total solid weight of the coating composition. The coating composition may comprise from 0.5 to 6 wt %, such as from 1 to 6 wt %, such as from 1.5 to 6 wt %, or even from 2 to 6 wt % polyhydroxyalkylamide material based on the total solid weight of the coating composition.

The coating composition may comprise up to 40 wt % polyhydroxyalkylamide material based on the total solid weight of the coating composition.

The coating composition may comprise from 1 to 10 wt % polyhydroxyalkylamide material based on the total solid weight of the coating composition.

When the coating composition is for a packaging end use, such as a food and/or beverage packaging end use, the food and/or beverage coating compositions may comprise up to 20 wt %, such as up to 15 wt %, such as up to 10 wt %, such as up to 6 wt % polyhydroxyalkylamide material based on the total solid weight of the coating composition. When the coating composition is for a packaging end use, such as a food and/or beverage packaging end use, the food and/or beverage coating compositions may comprise at least 0.5 wt %, such as at least 1 wt %, such as at least 1.5 wt %, such as at least 2 wt % polyhydroxyalkylamide material based on the total solid weight of the coating composition. When the coating composition is for a packaging end use, such as a food and/or beverage packaging end use, the food and/or beverage coating compositions may comprise from 0.5 to 20 wt %, such as from 0.5 to 15 wt %, such as from 0.5 to 10 wt %, such as from 0.5 wt % to 6 wt %. When the coating composition is for a packaging end use, such as a food and/or beverage packaging end use, the food and/or beverage coating compositions may comprise from 1 to 20 wt %, such as from 1 to 15 wt %, such as from 1 to 10 wt %, such as from 1 wt % to 6 wt %. When the coating composition is for a packaging end use, such as a food and/or beverage packaging end use, the food and/or beverage coating compositions may comprise from 1.5 to 20 wt %, such as from 1.5 to 15 wt %, such as from 1.5 to 10 wt %, such as from 1.5 wt % to 6 wt %. When the coating composition is for a packaging end use, such as a food and/or beverage packaging end use, the food and/or beverage coating compositions may comprise from 2 to 20 wt %, such as from 2 to 15 wt %, such as from 2 to 10 wt %, such as from 2 wt % to 6 wt %.

When the coating composition is for a packaging end use, such as a food and/or beverage packaging end use, the food and/or beverage coating compositions may comprise up to 6 wt % polyhydroxyalkylamide material based on the total solid weight of the coating composition.

When the film-forming resin comprises a resin having acid functionality, the coating composition may comprise any suitable ratio of equivalent weight of acid groups on the film-forming resin to equivalent weight of hydroxyalkylamide groups on the polyhydroxyalkylamide crosslinker. When the film-forming resin comprises a resin having acid functionality, the coating composition may have a ratio of equivalent weight of acid groups on the film-forming resin to equivalent weight of hydroxyalkylamide groups on the polyhydroxyalkylamide crosslinker of 0.5 to 2, such as 0.8 to 1.5, such as 0.9 to 1.2, or even 1. When the film-forming resin comprises a resin having acid functionality, the coating composition may have a ratio of equivalent weight of acid groups on the film-forming resin to equivalent weight of hydroxyalkylamide groups on the polyhydroxyalkylamide crosslinker of 0.8 to 1.5.

The coating compositions may further comprise a solvent. The solvent may comprise water and/or one or more organic solvent(s). The solvent may comprise at least 50 wt % water, such as at least 60% water, such as at least 70 wt % water, such as at least 80 wt % water, such as at least 85 wt % water, such as at least 90 wt % water, such as at least 95 wt % water, or even at least 99 wt % water based on the total solvent weight. The solvent may comprise up to 50 wt % of one or more organic solvent(s), such as up to 40% of one or more organic solvent(s), such as up to 30 wt % of one or more organic solvent(s), such as up to 80 wt % of one or more organic solvent(s), such as up to 15 wt % of one or more organic solvent(s), such as up to 10 wt % of one or more organic solvent(s), such as up to 5 wt % of one or more organic solvent(s), or even up to 1 wt % of one or more organic solvent(s) based on the total solvent weight.

The solvent may comprise 100 wt % water.

The solvent may comprise 100 wt % of one or more organic solvent(s).

The solvent may comprise at least 70 wt % water and up to 30 wt % of one or more organic solvent(s).

The solvent may comprise at least 70 wt % of one or more organic solvent(s) and up to 30 wt % water.

The organic solvent(s) may have a sufficient volatility to essentially entirely evaporate from the coating composition during the curing process. As a non-limiting example, the curing process may be by heating at 260 to 425° C. for 5 to 20 seconds.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Solvay); glycols such as butyl glycol; glycol ethers such as methoxypropanol; ethylene glycol monomethyl ether; ethylene glycol monobutyl ether and combinations thereof.

The solvent, when present, may be used in the coating composition in any suitable amount. The coating compositions may comprise at least 5 wt %, such as at least 20 wt %, such as at least 50 wt %, such as at least 75 wt %, or even at least 80 wt % solvent based on the total weight of the coating composition. The coating compositions may comprise up to 99.9 wt %, such as up to 99 wt %, such as up to 95 wt %, such as up to 90 wt %, such as up to 85 wt % solvent based on the total weight of the coating composition. The coating compositions may comprise from 5 to 99.9 wt %, such as from 5 to 99 wt %, such as from 5 to 95 wt %, such as from 5 to 90 wt %, such as from 5 to 85 wt % solvent based on the total weight of the coating composition. The coating compositions may comprise from 20 to 99.9 wt %, such as from 20 to 99 wt %, such as from 20 to 95 wt %, such as from 20 to 90 wt %, such as from 20 to 85 wt % solvent based on the total weight of the coating composition. The coating compositions may comprise from 50 to 99.9 wt %, such as from 50 to 99 wt %, such as from 50 to 95 wt %, such as from 50 to 90 wt %, such as from 50 to 85 wt % solvent based on the total weight of the coating composition. The coating compositions may comprise from 75 to 99.9 wt %, such as from 75 to 99 wt %, such as from 75 to 95 wt %, such as from 75 to 90 wt %, such as from 75 to 85 wt % solvent based on the total weight of the coating composition. The coating compositions may comprise from 80 to 99.9 wt %, such as from 80 to 99 wt %, such as from 80 to 95 wt %, such as from 80 to 90 wt %, such as from 80 to 85 wt % solvent based on the total weight of the coating composition.

The polyhydroxyalkylamide material and/or the film forming resin may be dissolved or dispersed in the said solvent during and/or after its formation.

The coating compositions may comprise a further crosslinking material. The coating compositions may comprise any suitable further crosslinking material. Suitable further crosslinking materials will be well known to the person skilled in the art.

The further crosslinking material may be a single molecule, a dimer, an oligomer, a (co)polymer or a mixture thereof. The further crosslinking material may be a dimer or trimer.

Suitable further crosslinking materials include, but are not limited to: phenolic resins (or phenol-formaldehyde resins); aminoplast resins (or triazine-formaldehyde resins); amino resins; epoxy resins; isocyanate resins; hydroxyl functional alkyl polyurea materials; alkylated carbamate resins; polyacids; anhydrides; organometallic acid-functional materials; polyamines; and/or polyamides and combinations thereof.

Suitable examples of phenolic resins are those formed from the reaction of a phenol with an aldehyde or a ketone, such as from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. The phenolic resins may be of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Allnex, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Sumitomo Bakelite co., ltd., such as BAKELITE 6582 LB, BAKELITE 6535, BAKELITE PF9989 or BAKELITE PF6581; SFC 112 commercially available from SI Group; those sold under the trade name DUREZ® commercially available from SHHPP, such as DUREZ 33356; those sold under the trade name ARALINK® commercially available from Bitrez, such as ARALINK 40-852; those sold under the trade name CURAPHEN® commercially available fro BITREZ Ltd, such as CURAPHEN 40-804 W75; or combinations thereof.

Suitable examples of isocyanate resins include, but are not limited to the following: isophorone diisocyanate (IPDI), such as those sold under the trade name DESMODUR® commercially available from Cevstro, for example DESMODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocyanate (HDI), such as those sold under the trade name DESMODUR® commercially available from Covestro, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Vencorex Chemicals, for example TOLONATE D2 or those sold under the trade name TRIXENE® commercially available from Baxenden, for example TRIXENE-BI-7984 or TRIXENE 7981; or combinations thereof.

The further crosslinking material may be in the form of a urea material. The further crosslinking material may comprise a hydroxyl substituted urea material. The further crosslinking material may comprise a hydroxy functional alkyl polyurea material.

The hydroxy functional alkyl polyurea material may comprise a material having the formula:

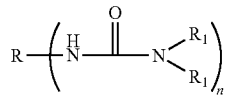

wherein R comprises an isocyanurate moiety, biuret moiety, allophonate moiety, glycoluril moiety, benzoguanamine moiety, polyetheramine moiety, and/or polymeric moiety different from a polyetheramine and having an Mn of 500 or greater; wherein each R1 is independently a hydrogen, alkyl having at least 1 carbon, or a hydroxy functional alkyl having 2 or more carbons and at least one R1 is a hydroxy functional alkyl having 2 or more carbons; and n is 2-6.

The hydroxy functional alkyl polyurea material may comprise a material having the formula:

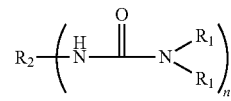

wherein R2 is a substituted or unsubstituted C1 to C36 alkyl group, an aromatic group, an isocyanurate moiety, biuret moiety, allophonate moiety, glycoluril moiety, benzoguanamine moiety, polyetheramine moiety, and/or polymeric moiety different from a polyetheramine and having an Mn of 500 or greater; wherein each R1 is independently a hydrogen, an alkyl having at least 1 carbon, or a hydroxy functional alkyl having 2 or more carbons and at least one R1 is a hydroxyl functional alkyl having 2 or more carbons; and n is 2-6.

Further details of suitable hydroxy functional alkyl polyurea materials are disclosed in PCT patent application WO 2017/123955, the entire contents of which are fully incorporated herein by reference.

The further crosslinking material may comprise a phenolic resin.

The further crosslinking material, when present, may be used in the coating composition in any suitable amount. The further crosslinking material, when present, may be used in amounts from 0.1 to 20 wt %, such as from 0.5 to 15 wt %, such as from 1 to 10 wt %, such as from 1 to 5 wt %, such as from 1 to 3 wt % based on the total solid weight of the coating composition.

The coating compositions may comprise up to 3 wt % polyhydroxyalkylamide material and up to 3 wt % further crosslinking material based on the total solid weight of the coating composition.

The coating compositions may comprise up to 3 wt % polyhydroxyalkylamide material and up to 3 wt % phenolic resin based on the total solid weight of the coating composition.

When the coating composition is for a packaging end use, such as a food and/or beverage packaging end use, the food and/or beverage coating compositions may comprise up to 3 wt % polyhydroxyalkylamide material and up to 3 wt % further crosslinking material based on the total solid weight of the coating composition.

When the coating composition is for a packaging end use, such as a food and/or beverage packaging end use, the food and/or beverage coating compositions may comprise up to 3 wt % polyhydroxyalkylamide material and up to 3 wt % phenolic resin based on the total solid weight of the coating composition.

The coating compositions may further comprise a catalyst. Suitable catalysts will be well known to the person skilled in the art. The catalyst may be a non-metal or a metal catalyst or a combination thereof. Suitable non-metal catalysts include, but are not limited to the following: phosphoric acid; blocked phosphoric acid; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof. The catalyst, when present, may be used in the coating composition in any suitable amount. The catalyst, when present, may be used in amounts from 0.001 to 10 wt %, such as from 0.001 to 5 wt %, such as from 0.01 to 5 wt %, or even from 1 to 3 wt % based on the total solid weight of the coating composition. The catalyst, when present, may be used in amounts from 0.01 to 1.5 wt % based on the total solid weight of the coating composition.

The coating compositions may comprise other optional materials well known in the art of formulating coatings, such as colorants, plasticizers, abrasion-resistant particles, antioxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts colour and/or other opacity and/or other visual effect to the composition. The colorant can be added to the coating composition in any suitable form, such as discrete particles, dispersions, solutions and/or flakes. A single colorant or a mixture of two or more colorants can be used in the coatings. Suitable colorants are listed in U.S. Pat. No. 8,614,286, column 7, line 2 through column 8, line 65, which is incorporated by reference herein. Suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein. The colorant, when present, may be used in the coating composition in any suitable amount. The colorant, when present, may be used in the coating composition in amounts up to 90 wt %, such as up to 50 wt %, or even up to 10 wt % based on the total solid weight of the coating composition.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. The surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, such as from 0.01 to 5 wt %, such as from 0.01 to 2 wt % based on the total solid weight of the coating composition.

The coating compositions may be substantially free, may be essentially free or may be completely free of bisphenol A (BPA) and derivatives thereof. Derivatives of bisphenol A include, for example, bisphenol A diglycidyl ether (BADGE). The coating compositions may be substantially free or completely free of bisphenol F (BPF) and derivatives thereof. Derivatives of bisphenol F include, for example, bisphenol F diglycidyl ether (BPFG). The compounds or derivatives thereof mentioned above may not be added to the coating composition intentionally but may be present in trace amounts because of unavoidable contamination from the environment. By "substantially free" we mean to refer to coating compositions, or components thereof, containing less than 1000 parts per million (ppm) of any of the compounds or derivatives thereof mentioned above. By "essentially free" we mean to refer to coating compositions, or components thereof, containing less than 100 ppm of any of the compounds or derivatives thereof mentioned above. By "completely free" we mean to refer to coating compositions, or components thereof, containing less than 20 parts per billion (ppb) of any of the compounds or derivatives thereof.

The coating compositions may be substantially free, may be essentially free or may be completely free of dialkyltin compounds, including oxides or other derivatives thereof. Examples of dialkyltin compounds include, but are not limited to one or more of the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. "Substantially free" refers to coating compositions, or components thereof, containing less than 1000 parts per million (ppm) of any of the compounds or derivatives thereof mentioned above. "Essentially free" refers to coating compositions, or components thereof, containing less than 100 ppm of any of the compounds or derivatives thereof mentioned above. "Completely free" refers to coating compositions, or components thereof, containing less than 20 parts per billion (ppb) of any of the compounds or derivatives thereof mentioned above.

The coating compositions may be substantially free, may be essentially free or may be completely free of bromine. "Substantially free" refers to coating compositions, or components thereof, containing less than 1000 parts per million (ppm) of bromine. "Essentially free" refers to coating compositions, or components thereof, containing less than 100 ppm of bromine. "Completely free" refers to coating compositions, or components thereof, containing less than 20 parts per billion (ppb) of any of bromine.

The coating compositions may be substantially free, may be essentially free or may be completely free of formaldehyde. "Substantially free" refers to coating compositions, or components thereof, containing less than 1000 parts per million (ppm) of formaldehyde. "Essentially free" refers to coating compositions, or components thereof, containing less than 100 ppm of any of formaldehyde. "Completely free" refers to coating compositions, or components thereof, containing less than 20 parts per billion (ppb) of formaldehyde.

The coating compositions may be substantially free, may be essentially free or may be completely free of diethanolamine. "Substantially free" refers to coating compositions, or components thereof, containing less than 1000 parts per million (ppm) of diethanolamine. "Essentially free" refers to coating compositions, or components thereof, containing less than 100 ppm of any of diethanolamine. "Completely free" refers to coating compositions, or components thereof, containing less than 20 parts per billion (ppb) of diethanolamine.

The coating compositions may be applied to any suitable substrate. The substrate may be formed of metal, plastic, composite and/or wood. The substrate may be a metal substrate.

The substrate may be an article such as an automotive product, a household or office appliance, furniture item or tool, a powered industrial product, a consumer electronics article, an architectural product or a product protected by an intumescent coating.

Examples of suitable metal substrates include, but are not limited to, food and/or beverage packaging, components used to fabricate such packaging or monobloc aerosol cans and/or tubes.

The food and/or beverage packaging may be a can. Examples of cans include, but are not limited to, two-piece cans, three-piece cans and the like. Suitable examples of monobloc aerosol cans and/or tubes include, but are not limited to, deodorant and hair spray containers. Monobloc aerosol cans and/or tubes may be aluminium monobloc aerosol cans and/or tubes.

The substrate may be a food and/or beverage packaging or component used to fabricate such packaging.

The substrate may be a monobloc aerosol can and/or tube.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans.

The coating compositions are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The substrate may be a package coated at least in part with any of the coating compositions described herein. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating compositions can be applied to the interior and/or the exterior of the package. The coating compositions could also be applied as a rim coat to the bottom of the can. The rim coat functions to reduce friction for improved handling during the continued fabrication and/or processing of the can. The coating compositions can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

The coating compositions of the present invention may be applied to at least a portion of the substrate. For example, when the coating compositions are applied to a food and/or beverage can, the coating compositions may be applied to at least a portion of an internal and/or external surface of said food and/or beverage can. For example, when the coating compositions are applied to a food and/or beverage can, the coating compositions may be applied to at least a portion of an internal surface of said food and/or beverage can.

The coating composition may be applied as a repair coating for component parts of food and beverage cans. For example, as a repair coating for a full aperture easy open end for food cans. This end component may repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

An automotive product may be a vehicle or any part thereof. Any part or any surface of the vehicle which may undergo coating to improve a property thereof (for example its luster, scratch resistance, corrosion resistance or UV resistance) may be a coating with a composition as defined herein.

The term "vehicle" is used in its broadest sense and includes (without limitation) all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. Vehicles can include ground vehicles such as, for example, trailers, cars, trucks, buses, coaches, vans, ambulances, fire engines, motorhomes, caravans, go-karts, buggies, fork-lift trucks, sit-on lawnmowers, agricultural vehicles such as, for example, tractors and harvesters, construction vehicles such as, for example, diggers, bulldozers and cranes, golf carts, motorcycles, bicycles, trains, and railroad cars. Vehicles can also include watercraft such as, for example, ships, submarines, boats, jet-skis and hovercraft.

Parts of vehicles coated may include vehicular body parts (e.g., without limitation, doors, body panels, trunk deck lids, roof panels, hoods, roofs and/or stringers, rivets, wheels, landing gear components, and/or skins used on an aircraft), hulls, marine superstructures, vehicular frames, chassis, and vehicular parts not normally visible in use, such as engine parts, motorcycle fairings and fuel tanks, fuel tank surfaces and other vehicular surfaces exposed to or potentially exposed to fuels, aerospace solvents and aerospace hydraulic fluids. Any vehicular parts which may benefit from coating as defined herein may undergo coating, whether exposed to or hidden from view in normal use.

Household and office appliances, furniture items and tools as defined herein are appliances, furniture items and tools used in the home, including the garden, or in office environments. They may include fabric washers, dishwashers, dryers, refrigerators, stoves, microwave ovens, computer equipment and printers, air conditioning units, heat pump units, lawn and garden equipment including lawn furniture, hot tubs, lawnmowers, garden tools, hedge trimmers, string trimmers (strimmers), chainsaws, garden waster shedders, garden hand tools such as, for example, spades, forks, rakes and cutting tools, cupboards, desks, table, chairs, cabinets and other articles. Any parts of any such articles which may benefit from coating as defined herein may undergo coating; for example panels of appliances or furniture and handles of tools.

A powered industrial product may include, for example, pumps, electricity generators, air compressors, industrial heat pumps and air conditioners, batteries and cement mixers. Any parts which benefit from coating as defined herein may undergo coating; for example panels and casings.

A consumer electronics article may be, for example, a computer, computer casing, television, cellphone, pager, camera, calculator, printer, scanner, digital decoder, clock, audio player, headphones or tablet.

An architectural product may be, for example, a door, window, door frame, window frame, beam or support, or a panel, walling item or roofing item used in building construction, or a solar panel, a wind turbine, an oil/gas well, an off-shore rig, a storage tank, or in transportation infrastructure or utilities infrastructure.

Products protected by intumescent coatings are typically metallic structures, for example steel structures, which are coating with an intumescent coating. The metallic structures are typically load bearing parts of buildings. Unprotected steel will typically begin to soften at around 425° C. and lose approximately half of its strength by 650° C. Intumescent coatings are employed to retard the temperature increase of the steel, or other substrate. An intumescent coating may be improved by incorporation of the defined acrylic polyester resin into the matrix of the intumescent material prior to its coating onto a metallic substrate to be protected. The acrylic polyester resin may be present in an amount of at least 1 wt %, such as at least 2 wt %, for example at least 4 wt %, or at least 5%. The acrylic polyester resin may be present in an amount of up to 50 wt % by weight, such as up to 30 wt %, for example up to 25 wt %. These definitions refer to the weight of the acrylic polyester resin by weight of the admixed acrylic polyester resin/intumescent matrix material to be applied to a substrate.

Articles coated may fall in two or more of the categories set out above. For example computer equipment may be regarded as a household or as an office item, and as a consumer electronics item. A beam or support—an architectural item—may be coated with an intumescent material.

In the uses defined above a coating composition is typically to coat surfaces and parts thereof (except for the use in an intumescent coating which is an admixture). A part may include multiple surfaces. A part may include a portion of a larger part, assembly, or apparatus. A portion of a part may be coated with an aqueous composition or powder composition as defined herein or the entire part may be coated.

The substrate may be new (i.e., newly constructed or fabricated) or it may be refurbished, such as, for example, in the case of refinishing or repairing a component of an automobile or aircraft.

As mentioned above, the substrate coated may comprise a vehicle. For example, an aqueous or powder composition may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). An aqueous or powder composition may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

The coating compositions may be applied to the substrate by any suitable method. Suitable methods of applying the coating compositions of the present invention will be well known to a person skilled in the art. Suitable application methods for the coating compositions include, but are not limited to the following: electrocoating, such as electrodeposition; spraying; electrostatic spraying; dipping; rolling; brushing; and the like.

The coating compositions may be applied to the substrate, or a portion thereof, as a single layer or as part of a multi layer system. The coating compositions may be applied as a single layer. The coating compositions may be applied to an uncoated substrate. For the avoidance of doubt an uncoated substrate extends to a surface that is cleaned prior to application. The coating compositions may be applied on top of another paint layer as part of a multi layer system. For example, the coating compositions may be applied on top of a primer. The coating compositions may form an intermediate layer or a top coat layer. The coating compositions may be applied as the first coat of a multi coat system. The coating compositions may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating.

It will be appreciated by a person skilled in the art that the coating compositions may be applied before or after forming the article, such as the packaging. For example, the coating compositions may be applied to metal substrate which is then shaped and formed into a metal article, or the coating composition may be applied to the preformed article.

The coating compositions may be applied to a substrate once or multiple times.

The coating compositions may be applied to the substrate by any suitable method. Methods of applying the coating compositions will be well known to a person skilled in the art. Suitable application methods for the coating compositions include, but are not limited to the following: electrocoating; spraying; electrostatic spraying; dipping; rolling; brushing; and the like.

Further information about suitable application methods of applying suitable coating compositions to substrates will now be given.

A liquid coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. The metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate may also comprise other suitable non-ferrous metals such as titanium or copper, as well as alloys of these materials.

The part to be coated may be in the shape of a cylinder, such as a pipe, including, for example, a cast iron or steel pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a sol-gel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution.

A liquid composition may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from an aqueous composition, optionally primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming polymer, cross-linking material and, if a colored base coat or monocoat, pigment. The primer layer(s) may optionally be disposed between the electrocoating layer and the topcoat layer(s). Alternatively, the topcoat layer(s) may be omitted such that the composite comprises the electrocoating layer and primer layer(s).

Moreover, the topcoat layer(s) may be applied directly onto the electrodepositable coating layer. In other words, the substrate may lack a primer layer such that the composite comprises the electrocoating layer and topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

"Powder" and like terms, as used herein, refers to materials that are in the form of solid particulates, as opposed to materials which are in the liquid form.

Powder coating compositions may be applied by any suitable method. Methods of applying said powder coating compositions will be well known to a person skilled in the art. Suitable application methods include, such as electrodeposition, or applied by ultra corona discharge for example. The powder coating compositions may be applied by ultra corona discharge.

When the substrate is electrically conductive, the powder coating composition is typically electrostatically applied. Electrodeposition generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition.

The coating compositions may be in the form of a liquid or a powder.

The coating compositions may be in the form of a liquid. The coating compositions may be solvent-borne or aqueous.

The coating compositions may be applied to the substrate by spraying. Thus, the coating compositions may be spray compositions. For the avoidance of doubt, by the term 'spray composition' and like terms as used herein is meant, unless specified otherwise, that the coating is suitable to be applied to a substrate by spraying, i.e. is sprayable.

The coating compositions may be applied to the substrate by electrodeposition. It has surprisingly and advantageously been found by the present inventors that the coatings of the present invention may be more amenable to being applied by electrodeposition compared to coatings comprising known small molecule (poly)hydroxyalkylamide crosslinkers. This may be because the polyhydroxyalkylamide materials of the present invention are more soluble in solvents compared to known small molecule (poly)hydroxyalkylamide crosslinkers.

Thus, the coating compositions may be coating compositions may be electrodepositable compositions. For the avoidance of doubt, by the term 'electrodepositable composition' and like terms as used herein is meant, unless specified otherwise, that the coating is suitable to be applied to a substrate by electrodeposition.

The coating compositions may be applied to any suitable dry film thickness. The coating compositions may be applied to a dry film thickness from 1 to 100 microns (μm), suitably from 1 to 75 μm, such as from 1 to 50 μm, such as from 1 to 40 μm, such as from 1 to 20 μm, or even from 1 to 10 μm.

The coating compositions and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in an aqueous or powder composition and/or layers deposited from the same, as well as any pretreatment layer, primer layer or topcoat layer, in such a level that they cause a burden on the environment. The term "substantially free" means that a coating composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that a coating composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that a coating composition and/or layers comprising the same, as well as any pretreatment layer, primer layer or topcoat layer, contain less than 1 ppb of chromium, based on total solids weight of the composition, the layer, or the layers, respectively, if any at all.

The coating compositions may be cured by any suitable method. The coating composition may be cured by heat curing, radiation curing, or by chemical curing, such as by heat curing. The coating composition, when heat cured, may be cured at any suitable temperature. The coating composition, when heat cured, may be cured to a peak metal temperature (PMT) of 150 to 350° C., such as from 175 to 320° C., such as from 190 to 300° C., or even from 200 to 280° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. The temperature reached by the metal substrate may be lower that the temperature which is applied thereto.

Curing the coating compositions may form a cured film.

The polyhydroxyalkylamide materials as described herein may be formed by any suitable method. For example, when Z is an acrylic polymer derived from monomers having ethylenic unsaturation, the polyhydroxyalkylamide material may be formed from a method comprising:
  (i) reacting one or more ethylenically unsaturated monomer(s) having an epoxy group with the reaction product of a diacid and an alkanolamine to form a hydroxyalkylamide-functional monomer; and
  (ii) causing the hydroxyalkylamide-functional monomer of step (i) to polymerise, optionally in the presence of one or more further ethylenically unsaturated monomer(s).

Alternatively or additionally, the polyhydroxyalkylamide material may be formed from a method comprising:
  reacting a pre-polymer having at least two epoxy groups and/or a diepoxide with the reaction product of a diacid and an alkanolamine.

Thus, the present invention provides a method of preparing a polyhydroxyalkylamide material, the method comprising reacting a pre-polymer having at least two epoxy groups and/or a diepoxide with the reaction product of a diacid and an alkanolamine.

The pre-polymer may be any suitable pre-polymer having at least two epoxy groups. The pre-polymer may be an acrylic pre-polymer having at least two epoxy groups. The pre-polymer may be an acrylic pre-polymer derived from monomers having ethylenic unsaturation, said pre-polymer having at least two epoxy groups. The acrylic pre-polymer may be formed from any suitable monomer(s) having ethylenic unsaturation. Suitable monomers are as defined herein in relation to Z, when Z is an acrylic polymer derived from monomers having ethylenic unsaturation.

The acrylic pre-polymer may be formed from one or more monomer(s) comprising an epoxy group. The acrylic pre-polymer may be formed from monomers comprising glycidyl acrylate, glycidyl methacrylate or combinations thereof, such as glycidyl methacrylate. The acrylic pre-polymer may be formed from monomers comprising glycidyl methacrylate, butyl methacrylate, methyl methacrylate, butyl acrylate, hydroxylethyl methacrylate and combinations thereof.

Alternatively or additionally, the acrylic pre-polymer may be post-modified to introduce epoxy-functionality thereto.

The diepoxide may be any suitable diepoxide. Suitable diepoxides are as defined herein in relation to Z, when Z is derived from a diepoxide.

The method comprises reacting the pre-polymer having at least two epoxy groups and/or the diepoxide with the reaction product of a diacid and an alkanolamine. The diacid may be any suitable diacid. Suitable diacids include, but are not limited to: oxalic acid; malonic acid; succinic acid; orthophthalic acid; isophthalic acid; maleic acid; fumaric acid; itaconic acid; methylmalonic acid; ethylmalonic acid; propylmalonic acid; 2-methylsuccinic acid; 2-ethylsuccinic acid; 2-propylsuccinic acid; trans-cyclopentane-1,2-dicarboxylic acid; cis-cyclopentane-1,2-dicarboxylic acid; trans-cyclohexane-1,2-dicarboxylic acid; cis-cyclohexane-1,2-dicarboxylic acid; 1,4-cyclohexane dicarboxylic acid; 2,6-naphthalene dicarboxylic acid; hexahydrophthalic acid; methyl hexahydrophthalic acid; acids and anhydrides of all the aforementioned acids; and combinations thereof.

The diacid may be represented by $R^{10}O-C(=O)-X-C(=O)-OR^{11}$ and/or the anhydride derivative thereof, wherein X is as defined herein; and $R^{10}$ and $R^{11}$ each independently represent $C_1$ to $C_{10}$ alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen.

The diacid may comprise maleic acid, fumaric acid, succinic acid, itaconic acid, acids and anhydrides of all the aforementioned acids, or combinations thereof. The diacid may comprise succinic acid, succinic anhydride, itaconic acid or combinations thereof. The diacid may comprise succinic anhydride, itaconic acid or combinations thereof.

The alkanolamine may be any suitable alkanolamine. The alkanolamine may be a $C_1$ to $C_{10}$ alkanolamine, such as a $C_1$ to $C_6$ alkanolamine, such as a $C_1$ to $C_4$ alkanolamine, or even a $C_1$ to $C_2$ alkanolamine. Suitable alkanolamines include, but are not limited to: methanolamine; ethanolamine; methyl ethanolamine; ethyl ethanolamine; 1-amino-2-propanol; 3-amino-1-propanol; 4-amino-1-butanol; 1-amino-2-butanol; 1-amino-3-butanol; dimethylamine; diethanolamine; methyl diethanolamine; and combinations thereof.

The alkanolamine may be represented by $NR^9R^{12}$—Y—OH, wherein $R^9$ and Y are each as defined herein; and $R^{12}$ represents hydrogen or $C_1$ to $C_{10}$ alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl. One of $R^9$ or $R^{12}$ may represent hydrogen and the other of $R^9$ or $R^{12}$ may represent methyl. $R^9$ and $R^{12}$ may each represent hydrogen.

The amine may comprise ethanolamine, methyl ethanolamine or combinations thereof.

The reaction product of a diacid and an alkanolamine may be produced by any suitable method. Suitable methods will be well known to a person skilled in the art. The diacid and alkanolamine may be reacted together at any suitable molar ratio of diacid to alkanolamine. For example, the diacid and alkanolamine may be reacted together at a molar ratio of diacid to alkanolamine of 1:1, or even 1:0.95.

The reaction product of a diacid and an alkanolamine may be according to formula (XIV):

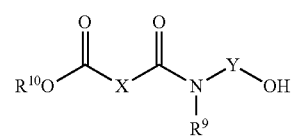

formula (XIV)

wherein X, Y, $R^9$ and $R^{10}$ are each as defined herein.

The method may be carried out at any suitable temperature. The method may be carried out at a temperature from 50 to 250° C., such as from 60 to 200° C., such as from 80 to 150° C., such as from 90 to 120° C., or even from 90 to 110° C. The method may be carried out at a temperature of at least 50° C., such as at least 60° C., such as at least 80° C., or even at least 90° C. The method may be carried out at a temperature up to 250° C., such as up to 200° C., such as up to 150° C., such as up to 120° C., or even up to 110° C. The method may be carried out at a temperature from 50 to 250° C., such as from 50 to 200° C., such as from 50 to 150° C., such as from 50 to 120° C., or even from 50 to 110° C. The method may be carried out at a temperature from 60 to 250° C., such as from 60 to 200° C., such as from 60 to 150° C., such as from 60 to 120° C., or even from 60 to 110° C. The method may be carried out at a temperature from 80 to 250° C., such as from 80 to 200° C., such as from 80 to 150° C., such as from 80 to 120° C., or even from 80 to 110° C. The method may be carried out at a temperature from 90 to 250° C., such as from 90 to 200° C., such as from 90 to 150° C., such as from 90 to 120° C., or even from 90 to 110° C.

The method may be carried out at a temperature of 100° C.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by carbonyl, silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like.

The term "alkenyl", as used herein, relates to hydrocarbon radicals having a double bond, such as up to 4, double bonds, being straight, branched, cyclic or polycyclic moieties or combinations thereof and containing from 2 to 18 carbon atoms, such as 2 to 10 carbon atoms, such as from 2 to 8 carbon atoms, such as 2 to 6 carbon atoms, such as 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=$CH_2$, becomes ethenylene, —CH=CH—, when represented as an alkenylene. Other alkenylene groups should be understood accordingly.

The term "alkynyl", as used herein, relates to hydrocarbon radicals having a triple bond, such as up to 4, triple bonds, being straight, branched, cyclic or polycyclic moieties or combinations thereof and having from 2 to 18 carbon atoms, such as 2 to 10 carbon atoms, such as from 2 to 8 carbon atoms, such as from 2 to 6 carbon atoms, such as 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like.

When the suffix "ene" is used in conjunction with a chemical group, e.g. "alkylene", this is intended to mean the group as defined herein having two points of attachment to other groups. As used herein, the term "$C_1$ to $C_{20}$ alkylene", by itself or as part of another substituent, refers to $C_1$ to $C_{20}$ alkyl groups that are divalent, i.e., with two points of attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. As set out above in relation to the terms "heteroalkyl", "heteroalkenyl" and "heteroalkynyl", the terms "heteroalkylene", "heteroalkenylene" and "heteroalkynylene" refer mutatis mutandis to an alkylene, alkenylene or alkynylene group containing one or more S, N, O, P, or Si atoms.

The term "Het", when used herein, includes four-to-twelve-membered, preferably four-to-ten-membered ring systems, which rings contain one or more heteroatoms selected from nitrogen, oxygen, sulphur and mixtures thereof, and which rings may contain one or more double bonds or be non-aromatic, partly aromatic or wholly aromatic in character. The ring systems may be monocyclic, bicyclic or fused. Each "Het" group identified herein is optionally substituted by one or more substituents selected from halo, cyano, nitro, oxo, lower alkyl (which alkyl group may itself be optionally substituted or terminated as defined below) $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$ or $C(S)NR^{25}R^{26}$ wherein $R^{19}$ to $R^{27}$ each independently represent hydrogen, aryl or lower alkyl (which alkyl group itself may be optionally substituted or terminated as defined below). The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Het may be at a carbon atom of the Het ring or, where appropriate, at one or more of the heteroatoms.

"Het" groups may also be in the form of an N oxide.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

As used herein, unless otherwise expressly specified, all numbers such as those expressing values, ranges, amounts or percentages may be read as if prefaced by the word "about", even if the term does not expressly appear. Also, the recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Singular encompasses plural and vice versa. For example, although reference is made herein to "a" polyhydroxyalkylamide material, "a" film-forming resin, "an" acrylic polymer, and the like, one or more of each of these and any other components can be used. As used herein, the term "polymer" refers to oligomers and both homopolymers and copolymers, and the prefix "poly" refers to two or more. Including, for example and like terms means including for example but not limited to.

The terms "comprising", "comprises" and "comprised of" as used herein are synonymous with "including", "includes" or "containing", "contains", and are inclusive or open-ended and do not exclude additional, non-recited members, elements or method steps. Additionally, although the present invention has been described in terms of "comprising", the coating compositions detailed herein may also be described as "consisting essentially of" or "consisting of".

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

The present invention may be according to the following aspects: 1. A polyhydroxyalkylamide material having the formula (I):

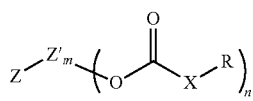

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

2. A polyhydroxyalkylamide material according to aspect 1, wherein the polymer is an acrylic polymer derived from monomers having ethylenic unsaturation.

3. A polyhydroxyalkylamide material according to aspect 2, wherein the monomers having ethylenic unsaturation comprise glycidyl methacrylate.

4. A polyhydroxyalkylamide material according to aspects 2 or 3, wherein Z' is substituted by an oxygen atom and a carbonyl group such that the polyhydroxyalkylamide material is represented by the formula (II):

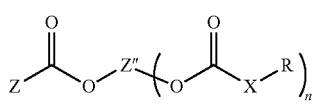

formula (II)

wherein Z represents an acrylic polymer derived from monomers having ethylenic unsaturation;

Z" represents an alkylene, alkenylene, alkynylene, aralkylene or arylene group;
X represents a bivalent organic bridging group; and
n is at least 2.

5. A polyhydroxyalkylamide material according to aspects 1 to 4, wherein Z is derived from a material having one or more epoxy group(s).

6. A polyhydroxyalkylamide material according to aspects 1 to 5, wherein R is according to formula (IV):

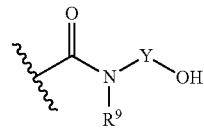

formula (IV)

such that the polyhydroxyalkylamide material is represented by the formula (V):

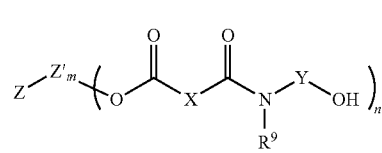

formula (V)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group;
$R^9$ represents hydrogen, an alkyl, alkenyl, alkynyl or aryl group, or —Y—OH; each Y independently represents an alkylene, alkenylene, alkynylene or arylene linking group; and
n is at least 2.

7. A polyhydroxyalkylamide material according to aspect 6, wherein $R^9$ is hydrogen or methyl and Y is ethylene.

8. A polyhydroxyalkylamide material according to aspects 6 or 7, wherein when $R^9$ is a methyl group and X is an alkylene group, $R^9$ together with one or more atom(s) of X forms a cyclic group such that the polyhydroxyalkylamide material is represented by the formula (VII):

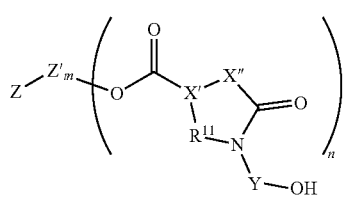

formula (VII)

wherein Z represents a polymer or an alkylene, alkenylene, alkynylene or arylene group;
Z' represents a bivalent organic linking group;
m is 0 or 1;
$R^{11}$ is the bivalent radical of $R^9$ and represents a methylene group;
X' is a fragment of X and represents —$CR^{11}$—, wherein $R^{11}$ represents hydrogen or a $C_1$ to $C_9$ alkyl group;

X" is the remaining fragment of X and represents a $C_0$ to $C_8$ alkylene group; and n is at least 2.

9. A coating composition, the coating composition comprising:
   a) a film-forming resin; and
   b) a polyhydroxyalkylamide material having the formula (I):

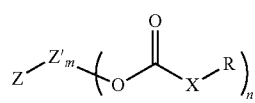

formula (I)

wherein Z represents polymer or an alkylene, alkenylene, alkynylene or arylene group;

Z' represents a bivalent organic linking group;

m is 0 or 1;

X represents a bivalent organic bridging group;

R represents a hydroxyalkylamide group; and n is at least 2.

10. A coating composition according to aspect 9, wherein the film-forming resin comprises a solution polymerised acrylic resin and an emulsion polymerised acrylic resin.

11. A coating composition according to aspects 9 or 10, wherein the coating composition comprises a further crosslinking material, the further crosslinking material comprising a phenolic resin.

12. A substrate at least partially coated with a coating, the coating being derived from a coating composition, the coating composition comprising:
   a) a film-forming resin; and
   b) a polyhydroxyalkylamide material having the formula (I):

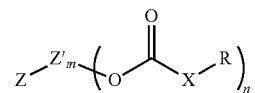

formula (I)

wherein Z represents a polymer or an alkylene, alkenylene, alkynylene or arylene group;

Z' represents a bivalent organic linking group;

m is 0 or 1;

X represents a bivalent organic bridging group;

R represents a hydroxyalkylamide group; and n is at least 2.

13. A package coated on at least a portion thereof with a coating, the coating being derived from a coating composition, the coating composition comprising:
   a) a film-forming resin; and
   b) a polyhydroxyalkylamide material having the formula (I):

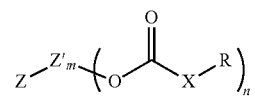

formula (I)

wherein Z represents a polymer or an alkylene, alkenylene, alkynylene or arylene group;

Z' represents a bivalent organic linking group;

m is 0 or 1;

X represents a bivalent organic bridging group;

R represents a hydroxyalkylamide group; and n is at least 2.

14. A method of preparing a polyhydroxyalkylamide material having the formula (I):

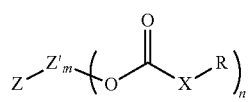

formula (I)

wherein Z represents a polymer or an alkylene, alkenylene, alkynylene or arylene group;

Z' represents a bivalent organic linking group;

m is 0 or 1;

X represents a bivalent organic bridging group;

R represents a hydroxyalkylamide group; and n is at least 2, the method comprising:
   reacting an acrylic pre-polymer derived from monomers having ethylenic unsaturation, said acrylic pre-polymer having at least two epoxy group(s), and/or a diepoxide with the reaction product of a diacid and an alkanolamine.

15. A coating composition, the coating composition comprising a polyhydroxyalkylamide material having the formula (I):

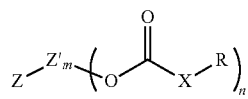

formula (I)

wherein Z represents a polymer derived from monomers having ethylenic unsaturation, and wherein Z has acid functionality;

Z' represents a bivalent organic linking group;

m is 0 or 1;

X represents a bivalent organic bridging group;

R represents a hydroxyalkylamide group; and n is at least 2.

16. A method of preparing a polyhydroxyalkylamide material having the formula (I):

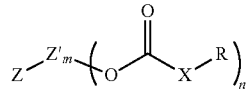

formula (I)

wherein Z represents an acrylic polymer derived from monomers having ethylenic unsaturation;

Z' represents a bivalent organic linking group;

m is 0 or 1;

X represents a bivalent organic bridging group;

R represents a hydroxyalkylamide group; and n is at least 2, the method comprising:
   (i) reacting one or more ethylenically unsaturated monomer(s) having an epoxy group with the reaction product of a diacid and an alkanolamine to form a hydroxyalkylamide-functional monomer; and (ii) causing the hydroxyalkylamide-functional monomer of step (i) to polymerise, optionally in the presence of one or more further ethylenically unsaturated monomer(s).

All of the features contained herein may be combined with any of the above aspects in any combination.

BRIEF DESCRIPTION OF THE DRAWINGS

For a better understanding of the invention, and to show how embodiments of the same may be carried into effect, reference will now be made, by way of example, to the accompanying diagrammatic drawings and the examples in which.

EXAMPLES

Polyhydroxyalkylamide Materials

Figure 1:
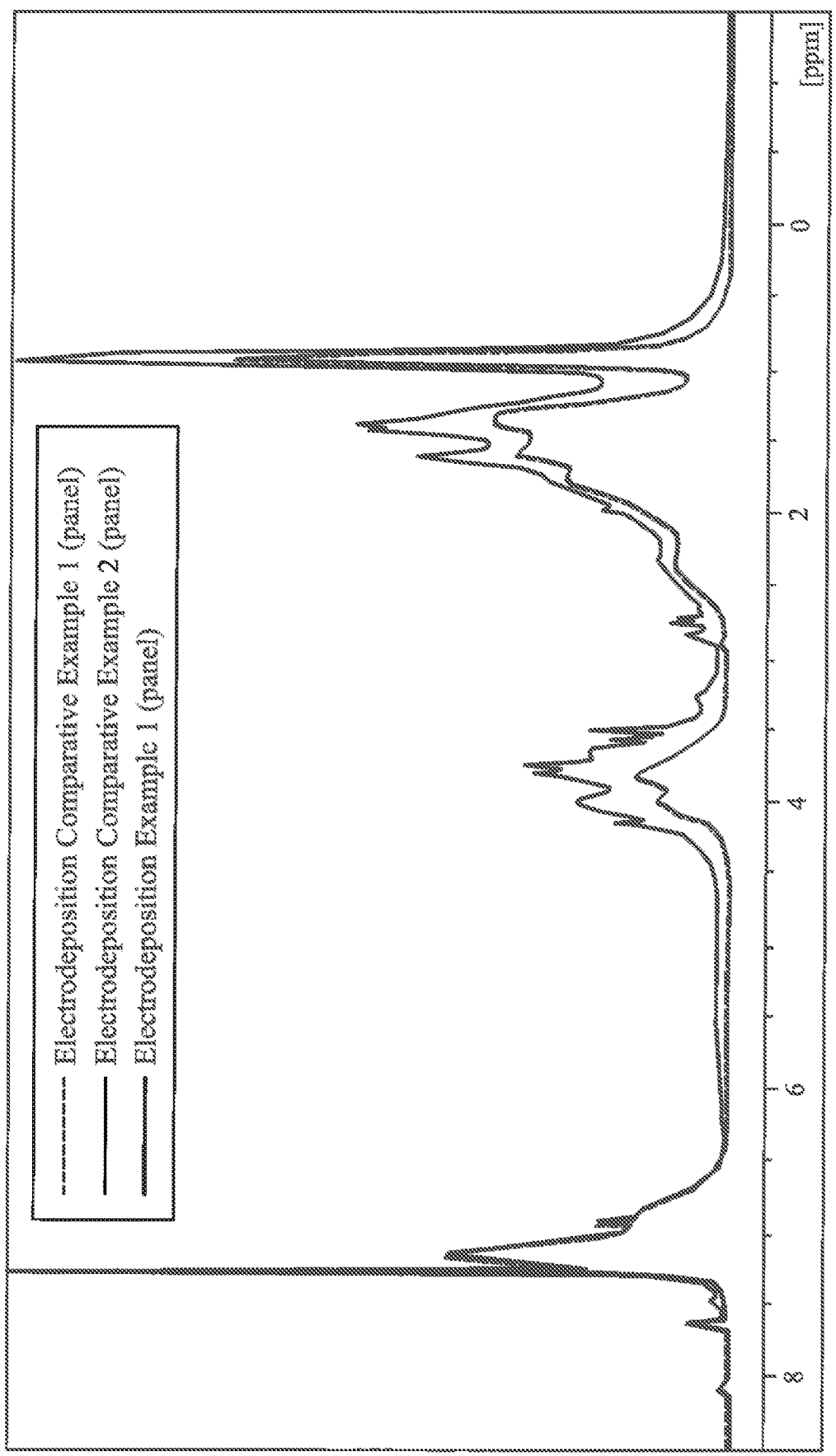
FIG. 1 shows a $^1$H NMR spectrum relating to the examples discussed herein.

Polyhydroxyalkylamide (polyHAA) examples 1 to 5 were prepared as follows.

Polyhydroxyalkylamide (polyHAA) Example 1

(A) Synthesis of Acrylic Pre-Polymer 1

Acrylic pre-polymer 1 was prepared according to the formulation in Table 1 and by the following method. All amounts are given in parts by weight (pbw) unless otherwise specified.

The polymerisation was carried out in a reactor equipped with heating, stirring and a water-cooled reflux condenser. A sparge of nitrogen was applied to the reactor to provide an inert atmosphere. Components 1 and 2 were charged to the reactor and heated to reflux at a temperature of 150 to 160° C. with stirring. A monomer mixture containing components 3, 4, 5 and 6 and an initiator mixture comprising components 7 and 8 were prepared separately and added to a monomer tank and an initiator tank, respectively. The monomer mixture (components 3, 4, 5, and 6) was added to the reactor at a temperature of 140° C. over a period of 150 minutes. The initiator mixture (components 7 and 8) was also added to the reactor at the same temperature but over a period of 180 mins, with the beginning of the initiator mixture charge starting 5 minutes after the monomer mixture had begun being charged to the reactor. At the end of the initiator feed, the reactor was held for 30 mins before components 9 and 10 were added over a period of 30 minutes. The reactor was then held for 60 minutes at reflux at 150° C. After this time, the reactor (containing the reaction mixture) was allowed to cool by removing the heat.

When the reaction mixture was below 100° C., component 5 was added to the reactor. The resultant acrylic pre-polymer was then removed from the reactor when hot. The resultant acrylic pre-polymer was 62% weight solids and had a Tg of 26.4° C.

TABLE 1

Formulation of acrylic pre-polymer 1
Acrylic Pre-polymer 1

| | Component | Amount/pbw |
|---|---|---|
| 1 | Butyl cellosolve | 314.30 |
| 2 | n-butyl alcohol | 83.80 |
| 3 | Glycidyl methacrylate | 500.00 |

TABLE 1-continued

Formulation of acrylic pre-polymer 1
Acrylic Pre-polymer 1

| | Component | Amount/pbw |
|---|---|---|
| 4 | Methyl methacrylate | 100.10 |
| 5 | Butyl acrylate | 100.00 |
| 6 | Butyl methacrylate | 300.10 |
| 7 | t-butyl peroxy-3,5,5-trimethylhexanoate | 66.67 |
| 8 | Butyl cellosolve | 66.70 |
| 9 | t-butyl peroxy-3,5,5-trimethylhexanoate | 5.00 |
| 10 | Butyl cellosolve | 10.00 |
| 11 | n-butyl alcohol | 83.80 |
| | Total | 1629.97 |

(B) Reaction of Itaconic Acid and Ethanolamine

The reaction was carried out in a 500 mL flask equipped with a condenser and thermocouple. A sparge of nitrogen was applied to the reactor to provide an inert atmosphere. 130.1 grams (g) itaconic acid in 260.2 g deionised water was charged to the flask at room temperature. Then, 58.03 g ethanolamine was added to the flask over a period of 30 minutes (in order to keep the reaction temperature below 50° C.). After the ethanolamine had been added, the flask was heated to reflux at 100° C. The reaction mixture was held at reflux until an amine equivalent weight (MEQ) of <0.20 was achieved. The flask (containing the reaction mixture) was allowed to cool before the product was poured out.

The resultant product had an acid value of about 125 mg KOH/g.

(C) Synthesis of Polyhydroxyalkylamide (polyHAA) 1

The reaction was carried out in a 500 mL flask equipped with a condenser thermocouple. A sparge of nitrogen was applied to the reactor to provide an inert atmosphere. 106 g of the acrylic pre-polymer made in step (A), 0.11 g tetrabutyl ammonium bromide and 64.14 g of the reaction product of itaconic acid and ethanolamine made in step (B) were added to the flask and heated to 100° C. The flask (containing the reaction mixture) was held at 100° C. until the acid value was measured to be below 10 mg KOH/g. Then, 53 g n-butanol was added before the product was poured out through a cone.

The resultant polyhydroxyalkylamide material was 62% by weight solids. The polyhydroxyalkylamide material had a Tg of 26.4° C.

Polyhydroxyalkylamide (polyHAA) Example 2

(A) Acrylic Pre-Polymer 2

Acrylic pre-polymer 2 was prepared according to the formulation in Table 2 and by the following method. All amounts are given in parts by weight (pbw) unless otherwise specified.

The polymerisation was carried out in a 3 L equipped with heating, cooling, stirring and a water-cooled reflux condenser. A sparge of nitrogen was applied to the flask to provide an inert atmosphere. Components 1 and 2 were charged to the flask and heated to a temperature of 144° C. with stirring. A monomer mixture containing components 3, 4, 5 and 6 and an initiator mixture comprising components 7 and 8 were prepared separately and added to a monomer tank and an initiator feed line, respectively. The initiator mixture (components 7 and 8) was added to the flask over a period of 180 mins. The monomer mixture (components 3, 4, 5 and 6) was also added to the flask but over a period of 150 minutes, with the beginning of the monomer mixture charge starting 5 minutes after the initiator mixture had begun being charged to the flask. At the end of the monomer/initiator feeds, the reactor was cooled to a temperature of 130° C. and was held at this temperature for 30 mins. After this time. components 9 and 10 were added over a period of 30 minutes. The reactor was then held for 60 minutes at 130° C. with stirring. Then, component 11 was added before the flask (containing the reaction mixture) was allowed to cool to 40° C. by removing the heat.

The resultant acrylic pre-polymer was 61% weight solids and had Mw of 6,457 Da.

TABLE 2

Formulation of acrylic pre-polymer 2
Acrylic Pre-polymer 2

| | Component | Amount/pbw |
|---|---|---|
| 1 | Butyl cellosolve | 314.30 |
| 2 | n-Butyl alcohol | 83.980 |
| 3 | Glycidyl methacrylate | 500.00 |
| 4 | Methyl methacrylate | 100.00 |
| 5 | Butyl acrylate | 100.00 |
| 6 | Butyl methacrylate | 300.00 |
| 7 | Luperox 270 [1] | 66.70 |
| 8 | Butyl cellosolve | 66.70 |
| 9 | Luperox270 | 5.00 |
| 10 | Butyl cellosolve | 10.00 |
| 11 | n-Butyl alcohol | 83.80 |
| | Total | 1630.48 |

[1] peroxyester polymer initiator (available from Arkema)

(B) Reaction of Succinic Anhydride and N-Methyl Ethanolamine

The reaction was carried out in a 3000 mL flask equipped with a condenser, additional funnel and thermocouple. A sparge of nitrogen was applied to the reactor to provide an inert atmosphere. 751.10 grams (g) N-methyl ethanolamine and 1000 g acetone were charged to the flask at room temperature. Then, the reaction mixture was slowly cooled to 0° C. Once the reaction mixture had reached this temperature, 1000.70 g succinic anhydride was added to the flask over a period of 60 minutes (in order to keep the reaction temperature below 20° C.). After the succinic anhydride had been added, the flask was slowly warmed to room temperature. The solvent (acetone) was then removed by vacuum distillation. The product was then poured out.

(C) Synthesis of Polyhydroxyalkylamide (polyHAA) 2

The reaction was carried out in a 1000 mL flask equipped with a condenser, additional funnel and thermocouple. A sparge of nitrogen was applied to the reactor to provide an inert atmosphere. 0.06 g of the reaction product of succinic anhydride and N-methyl ethanolamine made in step (B), 100.2 g n-butyl alcohol and 41.56 g tetrabutylammonium bromide were added to the flask and heated to 95° C. with stirring. Then, 115.62 g of the acrylic pre-polymer made in step (A) was added to the flask dropwise over a period of 2 hours (in order to keep the reaction temperature below 100° C.). The flask (containing the reaction mixture) was held at 100° C. until the acid value was measured to be below 10 mg KOH/g. After, the addition of the acrylic pre-polymer made in step (A), the reaction mixture was held at a temperature of 95° C. for about 16 hours until a stable acid value of 17 mg KOH/g was achieved. The flask (containing the reaction mixture) was then cooled to 40° C.

The resultant polyhydroxyalkylamide material was 42.44% by weight solids and had an Mw of 6,616 Da.

Polyhydroxyalkylamide (polyHAA) Example 3

(A) Reaction of Succinic Anhydride and N-Methyl Ethanolamine

The reaction was carried out in a 500 mL flask equipped with a condenser, additional funnel and thermocouple in a cooling bath. A sparge of nitrogen was applied to the reactor to provide an inert atmosphere. 50.04 grams (g) succinic anhydride in 105.07 g methanol was charged to the flask at room temperature. Then, the reaction mixture was slowly cooled to 0° C. Once the reaction mixture had reached this temperature, 37.56 g N-methyl ethanolamine was added to the flask over a period of 30 minutes (in order to keep the reaction temperature below 5° C.). After the N-methyl ethanolamine had been added, the flask was slowly warmed to room temperature. The reaction mixture was held at room temperature until a stable amine equivalent weight (MEQ) of 0.570 was achieved. The product was then poured out.

(B) Synthesis of Polyhydroxyalkylamide (polyHAA) 3

The reaction was carried out in a 1000 mL flask equipped with a condenser and thermocouple. A sparge of nitrogen was applied to the reactor to provide an inert atmosphere. 57.26 g of the reaction product of succinic anhydride and N-methyl ethanolamine prepared in step (A) and 59.80 g CELLOXIDE 2021 P (available from DAICEL U.S.A.) were added to the flask and heated to reflux at 80° C. with stirring. The reaction mixture was held at reflux for about 6 hours until an acid value of less than 5 mg KOH/g was reached (AV was 3.52 mg KOH/g). The flask (containing the reaction mixture) was then cooled to 40° C. before the product was poured out.

The resultant polyhydroxyalkylamide material was 57.44% by weight solids and had an Mw of 413 Da. The resultant polyhydroxyalkylamide material had a theoretical hydroxyalkylamide equivalent weight on solids of 547 g/equivalent.

Polyhydroxyalkylamide (polyHAA) Example 4

(A) Synthesis of Acrylic Pre-Polymer 3

An acrylic pre-polymer comprising 50% glycidyl methacrylate, 18% butyl methacrylate, 12% methyl methacrylate, 10% butyl acrylate and 10% hydroxyethyl methacrylate was prepared according to the formulation in Table 3 and by the following method. All amounts are given in parts by weight (pbw) unless otherwise specified.

The polymerisation was carried out in a 3 L flask equipped with heating, stirring and a water-cooled reflux condenser. A sparge of nitrogen was applied to the reactor to provide an inert atmosphere. Components 1 and 2 were charged to the reactor and heated to 144° C. with stirring. A monomer mixture containing components 3, 4, 5, 6 and 7 and an initiator mixture comprising components 8 and 9 were prepared separately. The initiator mixture (components 8 and 9) was added to the flask over a period of 180 mins. The monomer mixture (components 3, 4, 5, 6 and 7) was also added to the flask but over a period of 150 minutes, with the beginning of the monomer mixture charge starting 5 minutes after the initiator mixture had begun being charged to the flask. At the end of the initiator feed, the flask was cooled to 130° C. and held for 30 mins. Then, and still at a temperature of 130° C., components 10 and 11 were added to the flask over a period of 30 minutes with stirring. The flask was then held for 60 minutes at 130° C. After this time, component 12 was added to the flask before the flask (containing the reaction mixture) was allowed to cool to 40° C. by removing the heat. The product was then removed from the flask.

The resultant acrylic pre-polymer was 64.95% weight solids and had an Mw of 6018 Da.

TABLE 3

Formulation of acrylic pre-polymer 3
Acrylic Pre-polymer 3

| | Component | Amount/pbw |
|---|---|---|
| 1 | Butyl cellosolve | 305.30 |
| 2 | n-butyl alcohol | 83.90 |
| 3 | Glycidyl methacrylate | 500.00 |
| 4 | Methyl methacrylate | 220.20 |
| 5 | Butyl acrylate | 100.20 |
| 6 | Butyl methacrylate | 180.20 |
| 7 | Hydroxyethyl methacrylate | 100.00 |
| 8 | Luperox 270 [1] | 66.70 |
| 9 | Butyl cellosolve | 66.70 |
| 10 | Luperox 270 | 10.00 |
| 11 | Butyl cellosolve | 20.00 |
| 12 | n-butyl alcohol | 84.00 |
| | Total | 1737.20 |

[1] peroxyester polymer initiator (available from Arkema)

(B) Reaction of Itaconic Acid and Ethanolamine

The reaction was carried out in a 500 mL flask equipped with a condenser and thermocouple. A sparge of nitrogen was applied to the reactor to provide an inert atmosphere. 260.2 grams (g) itaconic acid, 1,8-Diazabicyclo[5.4.0]undec-7-ene (DBU) and 86.73 g deionised water were charged to the flask at room temperature. Then, the reaction mixture was slowly heated to 60° C. Once the reaction mixture had reached this temperature, 116.05 g ethanolamine was added to the flask over a period of 30 minutes. After the ethanolamine had been added, the reaction mixture was heated to reflux and held for approximately 15 hours until the amine equivalent weight (MEQ) was less than 0.2 (MEQ was 0.157). The reaction mixture was then cooled to 40° C. before the product was poured out.

(C) Synthesis of Polyhydroxyalkylamide (polyHAA) 4

The reaction was carried out in a 1000 mL flask equipped with a condenser and thermocouple. A sparge of nitrogen was applied to the reactor to provide an inert atmosphere. 500.00 g of acrylic pre-polymer 3 and 125.28 g of the reaction product of itaconic acid and ethanolamine produced in step (B) were added to the flask and heated to 100° C. with stirring. The reaction mixture was held at 100° C. for about 6 hours until an acid value of less than 2 mg KOH/g was reached (AV was 1.39 mg KOH/g). Then, 250.00 g n-butyl alcohol was added to the flask. The flask (containing the reaction mixture) was cooled to 40° C. before the product was poured out.

The resultant polyhydroxyalkylamide material was 49.3% weight solids. The polyhydroxyalkylamide material had an Mw of 6,414 Da and a hydroxyalkylamide equivalent weight of 773 g/equivalent.

Polyhydroxyalkylamide (polyHAA) Example 5

A polyhydroxyalkylamide material having multiple amide groups per hydroxyalkylamide group, R, and wherein the chain contained N-containing cyclic groups was prepared as follows.

(A) Acrylic Pre-Polymer

Acrylic pre-polymer 3 as described above in step (A) of the synthesis of polyhydroxyalkylamide (polyHAA) Example 4 was used in the synthesis of polyHAA 5.

(B) Reaction of Itaconic Acid and Ethanolamine

The reaction was carried out in a 1000 mL flask equipped with a condenser and thermocouple. A sparge of nitrogen was applied to the reactor to provide an inert atmosphere. 390.30 grams (g) itaconic acid and 130.10 g methyl isobutyl ketone (MIBK) was charged to the flask at room temperature. Then, 183.24 g ethanolamine was added to the flask dropwise over a period of 10 minutes. After the ethanolamine had been added, the reaction mixture was heated to reflux at 130° C. The reaction mixture was held at reflux for approximately 5 hours until an amine equivalent weight (MEQ) of less than 0.1 was achieved (MEQ was 0.081). Then, 2.53 g butyl stannoic acid and 1.56 g triphenyl phosphite was added to the flask and the reaction mixture was held at 130° C. until an acid value of about 40-50 mg KOH/g was reached (AV was 40.65 mg KOH/g). The resultant product was a solid and had a Mw of 819 Da.

(C) Synthesis of Polyhydroxyalkylamide (polyHAA) 5

The reaction was carried out in a 1000 mL flask equipped with a condenser and thermocouple. A sparge of nitrogen was applied to the reactor to provide an inert atmosphere. 125.00 g of acrylic pre-polymer 3, 275.98 g of the reaction product of itaconic acid and ethanolamine produced in step (B) and 0.28 g tetrabutylammonium bromide were added to the flask and heated to 100° C. with stirring. The reaction mixture was held at 100° C. for about 6 hours until an acid value of less than 5 mg KOH/g was reached (AV was 3.65 mg KOH/g). Then, 125.00 g n-butyl alcohol was added to the flask. The flask (containing the reaction mixture) was cooled to 40° C. before the product was poured out.

The resultant polyhydroxyalkylamide material was 70.79% weight solids.

COATING COMPOSITION EXAMPLES

Coating compositions comprising, among others, an acrylic latex, a solution acrylic and a polyhydroxyalkylamide (polyHAA) material were prepared as follows.

Latex Acrylic Example 1

Latex acrylic example 1 was prepared according to the formulation in Table 4 and by the following method. All amounts are given in parts by weight (pbw) unless otherwise specified.

The polymerisation was carried out in a reactor equipped with heating, cooling, stirring and a water-cooled reflux condenser. A sparge of nitrogen was applied to the reactor to provide an inert atmosphere. Components 1 and 2 were charged to the reactor and heated to 85° C. with stirring at a speed of 275 rpm. A monomer mixture containing components 5 to 10 and an initiator mixture containing components 3 and 4 were prepared separately and added to a monomer tank and initiator tank, respectively. The initiator mixture (components 3 and 4) was then fed to the reactor dropwise over a period of 20 minutes. At the end of the initiator feed, the reactor was held for 5 minutes. Then, the monomer mixture (components 5 to 10) was charged to the reactor at 80° C. over 240 minutes at a rate of 4.42 g/minute. At the same time as the monomer mixture (components 5 to 10), a pre-mix of components 11 and 12 was added to the reactor over 240 minutes at a rate of 0.4125 g/minute.

At the end of the monomer feed, the reactor was held for 60 minutes at 85° C. After this time, the reactor was allowed to cool to below 50° C. by removing the heat. Once the reactor was cooled, a pre-mix of components 13 and 14 were added over a period of 30 minutes. The reactor was then held for 10 minutes before the resultant emulsion polymerised acrylic latex material was removed from the reactor.

TABLE 4

Formulation of Latex Acrylic Example 1
Latex Acrylic Example 1

|   | Component | Amount/pbw |
|---|---|---|
| 1 | Deionised water | 1491.60 |
| 2 | Sodium bicarbonate | 4.31 |
| 3 | Deionised water | 167.34 |
| 4 | Ammonium persulfate | 2.20 |
| 5 | Butyl methacrylate | 273.00 |
| 6 | Methyl methacrylate | 274.20 |
| 7 | Butyl acrylate | 295.80 |
| 8 | Acrylic acid | 52.80 |
| 9 | Methacrylic acid | 152.50 |
| 10 | Benzoin | 10.50 |
| 11 | Hydrogen peroxide (35% solution) | 9.00 |
| 12 | Deionised water | 89.90 |
| 13 | Dimethylethanolamine | 57.30 |
| 14 | Deionised water | 684.43 |
|   | Total | 3564.88 |

Solution Acrylic Example 1

Solution acrylic example 1 was prepared according to the formulation in Table 5 and by the following method. All amounts are given in parts by weight (pbw) unless otherwise specified.

The polymerisation was carried out in a 5 L flask equipped with heating, cooling, stirring and a water-cooled reflux condenser. A sparge of nitrogen was applied to the flask to provide an inert atmosphere. Components 1 and 2 were charged to the flask and heated to reflux at a temperature of 135° C. with stirring. A monomer mixture containing components 5, 6 and 7 and an initiator mixture comprising components 3 and 4 were prepared separately. The monomer mixture (components 5, 6 and 7) and initiator mixture (components 3 and 4) were then fed to the flask via a feed funnel at 135° C. over a period of 180 minutes. At the end of the monomer/initiator feed, component 8 was added as wash for the feed funnel and the flask was maintained at reflux at 135° C. for an additional 60 minutes. A chase feed of initiator containing components 9 and 10 was then added to the flask over 20 minutes. The flask was then held for 60 minutes at reflux at 135° C. After this time, the flask (containing the reaction mixture) was allowed to cool to below 110° C. by removing the heat before component 11 was added. Then, a pre-mix of components 12 and 13 was added over a period of 10 minutes. After this time, the flask (containing the reaction mixture) was allowed to cool to below 40° C. by removing the heat.

The resultant solution polymerised acrylic material was then removed from the flask.

TABLE 5

Formulation of Solution Acrylic Example 1
Solution Acrylic Example 1

|   | Component | Amount/pbw |
|---|---|---|
| 1 | Ethylene Glycol n-butyl ether | 407.2 |
| 2 | n-butyl alcohol | 186.9 |
| 3 | t-butyl peroxy-3,5,5-trimethylhexanoate | 4.0 |
| 4 | Ethylene Glycol n-butyl ether | 40.0 |
| 5 | Butyl acrylate | 350.0 |
| 6 | Butyl methacrylate | 440.0 |
| 7 | Acrylic acid | 210.0 |
| 8 | Ethylene Glycol n-butyl ether | 7.5 |
| 9 | t-butyl peroxy-3,5,5-trimethylhexanoate | 8.5 |
| 10 | Ethylene Glycol n-butyl ether | 12.9 |
| 11 | n-butyl alcohol | 186.9 |
| 12 | Dimethylethanolamine | 130.1 |
| 13 | Deionised water | 93.5 |
|   | Total | 2077.5 |

Coating Examples 1 to 4

Coating composition examples 1 to 4 were prepared according to the formulations in Table 6.

TABLE 6

Formulation of Coating Examples 1 to 4

| Component | Coating Example 1 Wet/g | Solid/g | Coating Example 2 Wet/g | Solid/g | Coating Example 3 Wet/g | Solid/g | Coating Example 4 Wet/g | Solid/g |
|---|---|---|---|---|---|---|---|---|
| Latex acrylic example 1 [1] | 270.1 | 84.0 | 270.1 | 84.0 | 270.1 | 84.0 | 270.1 | 84.0 |
| Solution acrylic example 1 [2] | 19.0 | 10.0 | 19.0 | 10.0 | 19.0 | 10.0 | 19.0 | 10.0 |
| polyHAA example 3 [3] | 10.4 | 6.0 | — | — | 5.2 | 3.0 | — | — |
| polyHAA example 4 [4] | — | — | 12.2 | 6.0 | — | — | 6.1 | 3.0 |
| CURAPHEN 40-804 W75 [5] | — | — | — | — | 4.0 | 3.0 | 4.0 | 3.0 |
| Deionised water | 220.0 | — | 223.6 | — | 213.7 | — | 220.2 | — |
| n-butyl alcohol | 25.5 | — | 25.5 | — | 25.2 | — | 25.5 | — |
| Ethylene glycol n-butyl ether | 9.7 | — | 9.7 | — | 9.7 | — | 9.7 | — |

TABLE 6-continued

Formulation of Coating Examples 1 to 4

| Component | Coating Example 1 | | Coating Example 2 | | Coating Example 3 | | Coating Example 4 | |
|---|---|---|---|---|---|---|---|---|
| | Wet/g | Solid/g | Wet/g | Solid/g | Wet/g | Solid/g | Wet/g | Solid/g |
| Amyl alcohol | 10.0 | — | 10.0 | — | 10.0 | — | 10.0 | — |
| Dimethylethanolamine | 2.0 | — | 2.0 | — | 2.0 | — | 2.0 | — |
| Total | 566.7 | 100 | 572.1 | 100 | 559.2 | 100 | 566.6 | 100 |

[1] 31.1% solids
[2] 52.5% solids
[3] 57.4% solids
[4] 49.3% solids
[5] 74% phenolic resin in deionised water (available from BITREZ Ltd)

Comparative Coating Example 1

Comparative coating example 1 is a commercial inside spray available from PPG Industries containing a latex acrylic and a phenolic crosslinker.

The properties of the coatings were then tested by the following methods. The results are shown in Table 7.

Test panel preparation: Coated panels were prepared by coating flat aluminium cans using a bar coater. The dry film weight for the coating layer was 5 to 6 g/m$^2$ (gsm). After application, the coated panels were baked in a box oven for 1 minute 45 seconds at 215° C.

Wedge Bend Test: A 10 cm×4 cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate (CuSO$_4$) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted.

MEK Double rubs: The number of reciprocating rubs required to remove the coating composition from coated test panels was measured using a two pound ball hammer with gauze soaked in methyl ethyl ketone (MEK) covering the end of the hammer.

Processing in various simulants: Coated panels cut into 10 cm×5 cm panels were placed in a container containing one of 5% acetic acid, deionised water or 1% Joy solution such that the panel was submerged in the solution. The container was then placed in an autoclave and processed according to the parameters in Table 5 (i.e. 30 minutes at 100° C., 45 minutes at 82° C. or 10 minutes at 82° C. for 5% acetic acid, deionised water or 1% Joy solution, respectively). After this time, the panels were assessed by the following methods:

Adhesion: The processed panels were tested for coating adhesion to the aluminium substrate using a BYK Cross-Cut Tester Kit #5127 (commercially available from BYK-Gardner GmbH) in accordance with ASTM D3359. The cutter spacing was 1.5 mm and Scotch 610 tape was used. The results were rated on a scale of 0 to 5. Grade 0 corresponds to good adhesion with no removal of coating (0% loss), grade 1 corresponds to a coating loss of <5%, grade 2 corresponds to a coating loss of 5 to 15%, grade 3 corresponds to a coating loss of 16 to 5%, grade 4 corresponds to a coating loss of 36 to 65% and grade 5 corresponds to a coating loss of >65%.

TABLE 7

Test Results

| | Coating Example 1 | Coating Example 2 | Coating Example 3 | Coating Example 4 | Comparative Coating Example 1 |
|---|---|---|---|---|---|
| Wedge Bend Test | 51 | 49 | 50 | 49 | 65 |
| MEK Double Rubs | 2 | 2 | 20 | 10 | 100 |
| 5% acetic acid, 30 mins, 100° C. | | | | | |
| Adhesion | 0 | 2 | 0 | 0 | 3 |
| Deionised water, 45 mins, 82° C. | | | | | |
| Adhesion | 0 | 0 | 0 | 0 | 0 |
| 1% Joy Detergent, 10 mins, 82° C. | | | | | |
| Adhesion | 0 | 0 | 0 | 0 | 0 |

The results show that coating compositions containing the polyhydroxyalkylamide materials of the invention perform as well, or better, than the coatings of the comparative examples.

Solubility

The solubility of PRIMID XL 552 and PRIMID QM 1260 (each available from EMS Chemie) in solvents was tested according to the following method:

Solubility: a solvent mixture of n-butyl alcohol and ethylene glycol n-butyl ether was prepared in accordance with Table 8. Then, 0.5 g of the PRIMID crosslinker according to Table 8 was added. Solid pieces of the PRIMID crosslinker were broken up via mechanical mixing and sonication, as required. The mixture was stirred for at least 30 minutes with gentle heating (<80 C). Then, the mixture was cooled to room temperature. The solubility was assessed visually by inspecting for undissolved solids or haziness. If soluble, the process was repeated with 0.5 g additions of PRIMID crosslinker until insoluble concentration was found.

The results are shown in Table 8.

TABLE 8

Solubility Results

| | PRIMID XL 552 | | PRIMID QM 1260 | |
|---|---|---|---|---|
| Primid (g) | 0.5 | 0.5 | 0.5 | 0.5 |
| n-butyl alcohol (g) | 4.8 | 4.2 | 4.8 | 4.2 |
| Ethylene glycol n-butyl ether (g) | 1.2 | 1.8 | 1.2 | 1.8 |
| % total solids | 7.69% | 7.69% | 7.69% | 7.69% |
| BuOH-BC ratio | 4:1 | 7:3 | 4:1 | 7:3 |
| Solubility? | Insoluble | Insoluble | Insoluble | Insoluble |

The results show that the known small molecule (poly) hydroxyalkylamide crosslinkers are insoluble in, at least, the organic solvents used in coating examples 1 to 4. The polyhydroxyalkylamide materials of the invention are soluble in these solvents, as shown by the fact that the polyhydroxyalkylamide materials of the invention are synthesised in these solvents. For example, the acrylic prepolymers are synthesised in, and contain, n-butyl alcohol and ethylene glycol n-butyl ether (i.e. butyl cellosolve). Also, n-butyl alcohol is used as a solvent in the synthesis of the polyhydroxyalkylamide materials.

Hydrolytic Stability Examples 1 to 4

The hydrolytic stability of polyhydroxyalkylamide materials in a coating composition was tested according to the following method.

Latex Acrylic Examples 2 to 5

Latex acrylic examples 2 to 5 were prepared according to the formulations in Table 9 and by the following method. All amounts are given in parts by weight (pbw) unless otherwise specified.

The polymerisation was carried out in a reactor equipped with heating, cooling, stirring and a water-cooled reflux condenser. A blanket of nitrogen was applied to the reactor to provide an inert atmosphere. Components 1 and 2 were charged to the reactor and heated to 80° C. with stirring at a speed of 275 rpm. A monomer mixture containing components 5 to 9 and an initiator mixture containing components 3 and 4 were prepared separately and added to a monomer tank and initiator tank, respectively. The initiator mixture (components 3 and 4) was then fed to the reactor dropwise over a period of 20 minutes. At the end of the initiator feed, the reactor was held for 5 minutes. Then, the first 10 wt % of the monomer mixture (components 5 to 9) was charged to the reactor at 80° C. over 60 minutes, followed by 20 wt % of the monomer mixture (components 5 to 9) over the next 60 minutes, and finally the remaining 70 wt % of the monomer mixture (components 5 to 9) over 120 minutes.

At the end of the monomer feed, the reactor was held for 60 minutes at 80° C. After this time, the reactor was allowed to cool to below 50° C. by removing the heat. Once the reactor was cooled, a pre-mix of components 10 and 11 were added over a period of 30 minutes. The reactor was then held for 10 minutes before the resultant emulsion polymerised acrylic latex material was removed from the reactor.

TABLE 9

Formulation of Acrylic Latex Examples 2 to 5

| | Component | Acrylic Latex Example 2 | Acrylic Latex Example 3 | Acrylic Latex Example 4 | Acrylic Latex Example 5 |
|---|---|---|---|---|---|
| | | Amount/pbw | | | |
| 1 | Deionised water | 4565.60 | 4437.49 | 633.59 | 570.13 |
| 2 | Sodium bicarbonate | 6.53 | 2.86 | 0.41 | 0.81 |
| 3 | Deionised water | 985.60 | 862.40 | 123.30 | 123.20 |
| 4 | Ammonium persulfate | 12.32 | 10.78 | 1.54 | 1.54 |
| 5 | Butyl methacrylate | 1120.00 | 980.00 | 140.00 | 262.50 |
| 6 | Methyl methacrylate | 560.20 | 612.60 | 87.50 | 0.00 |
| 7 | Butyl acrylate | 840.00 | 735.00 | 105.00 | 17.50 |
| 8 | Acrylic acid | 280.00 | 122.70 | 17.50 | 35.00 |
| 9 | 2-ethylhexyl acrylate | — | — | — | 35.00 |
| 10 | Deionised water | 1212.90 | 530.30 | 76.20 | 152.32 |
| 11 | Dimethylethanolamine | 86.60 | 37.90 | 5.44 | 10.90 |
| | Total | 9669.75 | 8332.03 | 1190.48 | 1208.90 |

Coating Examples 2 to 5

Latex acrylic examples 2 to 5 were then formulated into coating examples 2 to 5 as follows: 308.92 g of the latex acrylic according to Table 9, 26.67 g of the polyhydroxyalkylamide material according to Table 9, 2.5 g phosphoric acid in dimethylethanolamine (DMEA), 25.5 g n-butyl alcohol, 10 g amyl alcohol, 10 g butyl cellosolve and 8.57 g of a 50% solution of DMEA in deionised water.

The hydrolytic stability of the polyhydroxyalkylamide materials in coating examples 2 to 5 was then tested according to the following methods:

Test panel preparation: coated panels were prepared by coating flat aluminium cans using a bar coater. The dry film weight for the coating layer was 5 to 6 g/m$^2$ (gsm). After application, the coated panels were baked in a box oven for 1 minute 45 seconds at 215° C.

Hydrolytic stability: the coated panels were placed in a container containing 20% ethanol or 3% acetic acid ('extraction solvents') according to Table 8 such that the panel was submerged in the solution. The container was then placed in an autoclave and processed according to the parameters in Table 8. After this time, the extraction solvents were assessed by gradient elution LC-MS/MS quantitation suitable for detecting hydroxylamines in the low ng/mL range. The extraction solvents of examples 1 and 2 and comparative examples 1, 2 and 3 were diluted 500-fold for analysis, whereas the extraction solvents for examples 3 and 4 were undiluted.

The results are shown in Table 10.

Hydrolytic Stability Comparative Examples 1 to 3

The method described above for hydrolytic stability examples 1 to 4 was repeated with the exception that PRIMID XL 552 or PRIMID QM 1260 (each available from EMS Chemie) was used instead of the polyhydroxyalkylamide materials of the invention, in accordance with Table 9.

The results are shown in Table 10.

TABLE 10

Hydrolytic Stability Test Results

| Hydrolytic Stability Example | Acrylic Latex Example | (poly)HAA | Extraction Conditions | Amount of Amine after Extraction / (µg/6 dm$^2$) |
|---|---|---|---|---|
| Example 1 | Example 4 | polyHAA Example 2 | 20% Ethanol 1 hour | 41.5 |
| Example 2 | Example 5 | polyHAA Example 2 | 100° C. | 37.5 |
| Example 3 | Example 4 | polyHAA Example 1 | | <30.0 |
| Example 4 | Example 5 | polyHAA Example 1 | | <30.0 |
| Comparative example 1 | Example 1 | PRIMID XL 552 | 3% Acetic acid 2 hours | 2,364 |
| Comparative example 2 | Example 1 | PRIMID XL 552 (purified) | 121° C. | 1,212 |
| Comparative example 3 | Example 2 | PRIMID QM 1260 | | 240 |

The results show that the polyhydroxyalkylamide materials of the invention are more hydrolytically stable than those of the comparative examples. This is because less free amine is present in the extraction solvents for the inventive examples compared to the comparative examples.

Electrodeposition

The ability of the polyhydroxyalkylamide materials of the invention to be applied to a substrate by electrodeposition was tested according to the following method.

Anionic Acrylic Resin 1

Anionic acrylic resin 1 was prepared according to the formulation in Table 11 and by the following method. All amounts are given in parts by weight (pbw) unless otherwise specified.

The reaction was carried out in a 5000 mL flask equipped with a condenser, distillation apparatus, and thermocouple. A blanket of nitrogen was applied to the reactor to provide an inert atmosphere. Component 1 was charged to the flask at room temperature. The reaction mixture was then heated to reflux with a temperature set-point of 120° C. The monomer mixture (components 2, 3, 4, 5, 6, and 7), the initiator mixture (components 8 and 9), and AMPS monomer mixture (components 10, 11, and 12) were all fed into the flask separately and simultaneously over a period of 180 minutes while continuing to heat the reaction mixture at reflux. Upon the completion of the three feeds, the reaction mixture was held at reflux for 30 minutes. Then, half of the second initiator mixture (components 13 and 14) was fed over 10 minutes. The reaction mixture was then held at reflux for 60 minutes. Then, the remaining portion of the second initiator mixture (components 13 and 14) was fed over 10 minutes. The reaction mixture was then held at reflux for 60 minutes. After this time, the reaction mixture was cooled to 115° C. Vacuum was gradually applied and increased as needed to collect 644.4 g of collected distillate. Vacuum was then broken and replaced with a blanket of nitrogen. The reaction mixture was then equilibrated to 90° C. before component 15 was fed into the flask over 20 minutes. Then, a mixture of components 16 and 17 was fed into the flask over 30 minutes at 90° C. The reaction mixture was then held at 90° C. for 30 minutes to complete the reaction.

The resultant anionic acrylic resin dispersion was 87.4% weight solids and had an Mw of 15,454 Da.

TABLE 11

Formulation of Anionic Acrylic Resin 1
Anionic Acrylic Resin 1

| | Component | Amount/pbw |
|---|---|---|
| 1 | n-Butyl alcohol | 333.2 |
| 2 | Methacrylic acid | 239.4 |
| 3 | Styrene | 848.8 |
| 4 | Butyl acrylate | 848.8 |
| 5 | 2-Hydroxyethyl acrylate | 228.5 |
| 6 | Tertiary dodecyl mercaptan | 70.6 |
| 7 | n-Butyl alcohol | 5.1 |
| 8 | n-Butyl alcohol | 113.8 |
| 9 | t-Butylperbenzoate | 26.2 |
| 10 | n-Butyl alcohol | 200.6 |
| 11 | AMPS 2401 monomer[1] | 10.9 |
| 12 | Diisopropanolamine | 7.3 |
| 13 | N-Butyl alcohol | 25.5 |
| 14 | t-Butylperbenzoate | 5.9 |
| 15 | Deionized water | 205.7 |
| 16 | Dimethylthanolamine | 110.2 |
| 17 | Deionized water | 17.1 |
| | Total | 2653.2 |

[1]Sulfonic acid acrylic monomer (available from Lubrizol)

Electrodeposition Example 1

A coating composition for electrodeposition example 1 was prepared according to the formulation in Table 12. The coating was then tested according to the following method.

Test Panel Preparation: aluminium "Q" panels (0.0245 inch thickness) were cut into 4 inch by 4 inch squares for electrodeposition. The panels were immersed 7 centimetres into the electrodeposition baths and connected to the anode of the direct current source. The power source was programed to raise the voltage over the first 30 seconds of electrodeposition and then to hold the voltage at the chose value for the duration of the electrodeposition process. The coating composition was electrodeposited according to the conditions in Table 12. After electrodeposition the voltage was disengaged, the panels were rinsed vigorously with deionized water and allowed to air dry overnight. Panels with the electrodeposited coating thereon are referred to as the 'panel' samples in the accompanying Figures.

NMR Analysis: the composition of the deposited coating was analysed by $^1$H-NMR and $^{13}$C-NMR. The air-dried panels were washed with THF-D$_8$ or CDCl$_3$ (as appropriate) and then dried under a stream of nitrogen to concentrate the sample. The resulting spectra were compared to the $^1$H-NMR and $^{13}$C-NMR spectra of air-dried samples of the electrodeposition bath mixtures (referred to as 'bath' samples in the accompanying figures).

Electrodeposition Comparative Examples 1 and 2

The method described above for electrodeposition example 1 was repeated with the exception that the coating compositions and electrodeposition conditions according to Table 12 were used instead of the coating composition and electrodeposition conditions of electrodeposition example 1.

Electrodeposition Comparative Example 3

Electrodeposition comparative example 3 was prepared in order to identify the carbon peaks in the NMR spectrum that correspond to the HAA functionality. Electrodeposition example 3 was the reaction product of itaconic acid and ethanolamine prepared in step (B) of the synthesis of polyhydroxyalkylamide (polyHAA) example 4 dissolved in the same deuterated solvent as used in electrodeposition example 1.

TABLE 12

Formulation of Coatings for Electrodeposition Example 1 and Comparative Examples 1 and 2

| Component | Electrodeposition Example 1 | | Electrodeposition Comparative Example 1 | | Electrodeposition Comparative Example 2 | |
|---|---|---|---|---|---|---|
| | Wet/g | Solid/g | Wet/g | Solid/g | Wet/g | Solid/g |
| Anionic acrylic resin 1 [1] | 67.1 | 58.6 | 115.8 | 101.2092 | 108.0 | 94.4 |
| polyHAA Example 4 [2] | 80.1 | 39.5 | — | — | — | — |
| PRIMID XL 552 [3] | — | — | — | — | 15.2 | 15.2 |
| Ethylene Glycol n-butyl ether | — | — | 12 | — | 11.2 | — |
| n-Butyl alcohol | — | — | 28 | — | 26.1 | — |
| Isopropanol | 8.4 | — | — | — | — | — |
| Deionized water | 910 | — | 910 | — | 863.9 | — |
| Total | 1065.6 | 98.1 | 1065.8 | 101.2 | 1024.4 | 109.6 |
| Deposition Conditions | | | | | | |
| Deposition time (s) | 180 | | 60 | | 180 | |
| Voltage (V) | 250 | | 50 | | 250 | |
| Bath temperature (° F.) | 107 | | 95 | | 107 | |

[1] 87.4% solids
[2] 49.3% solids
[3] 100% solids (available from EMS)

Figure 2:
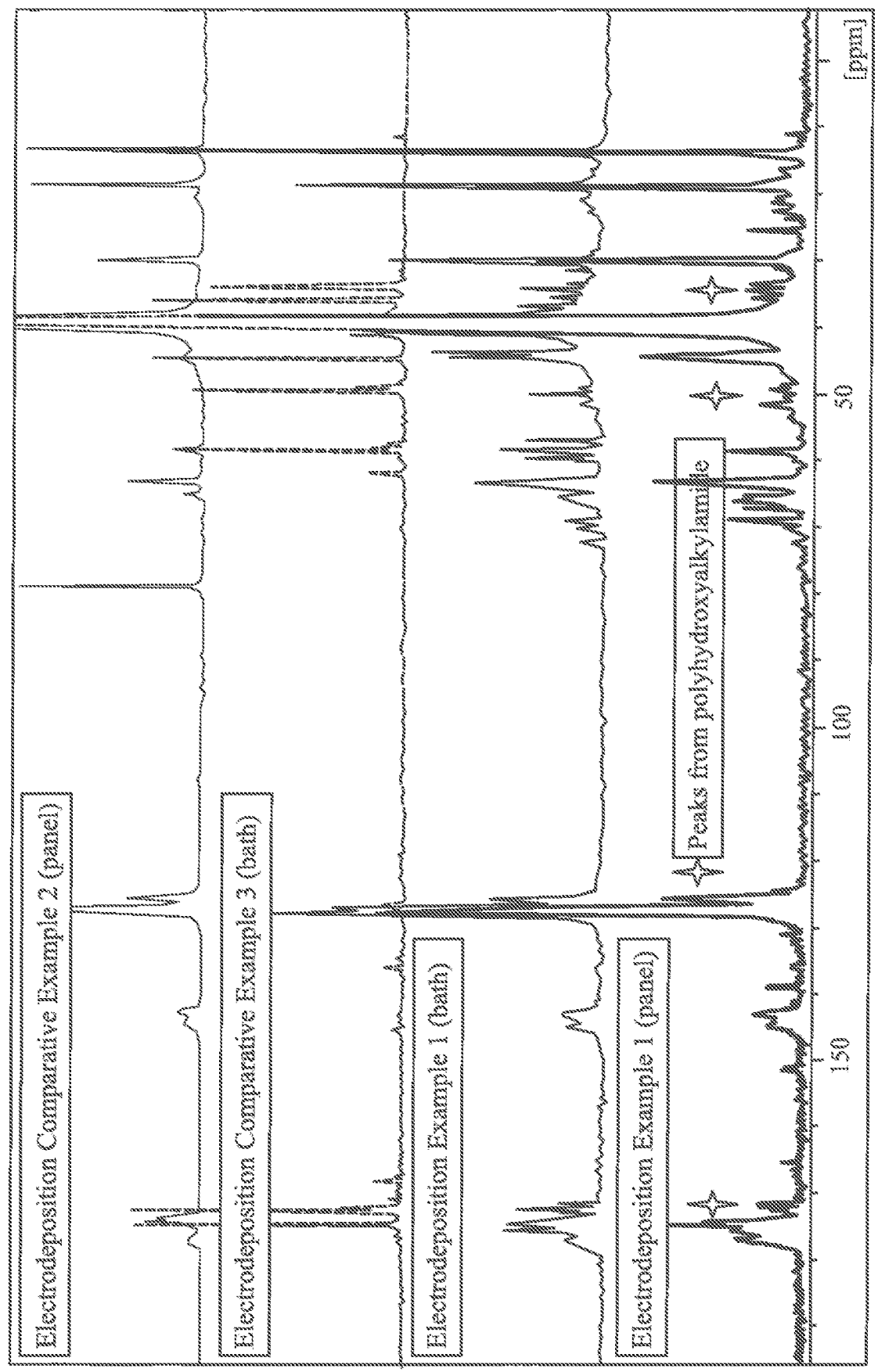
FIGS. 2 and 3 show $^{13}$C NMR spectra relating to the examples discussed herein.
Figure 3:
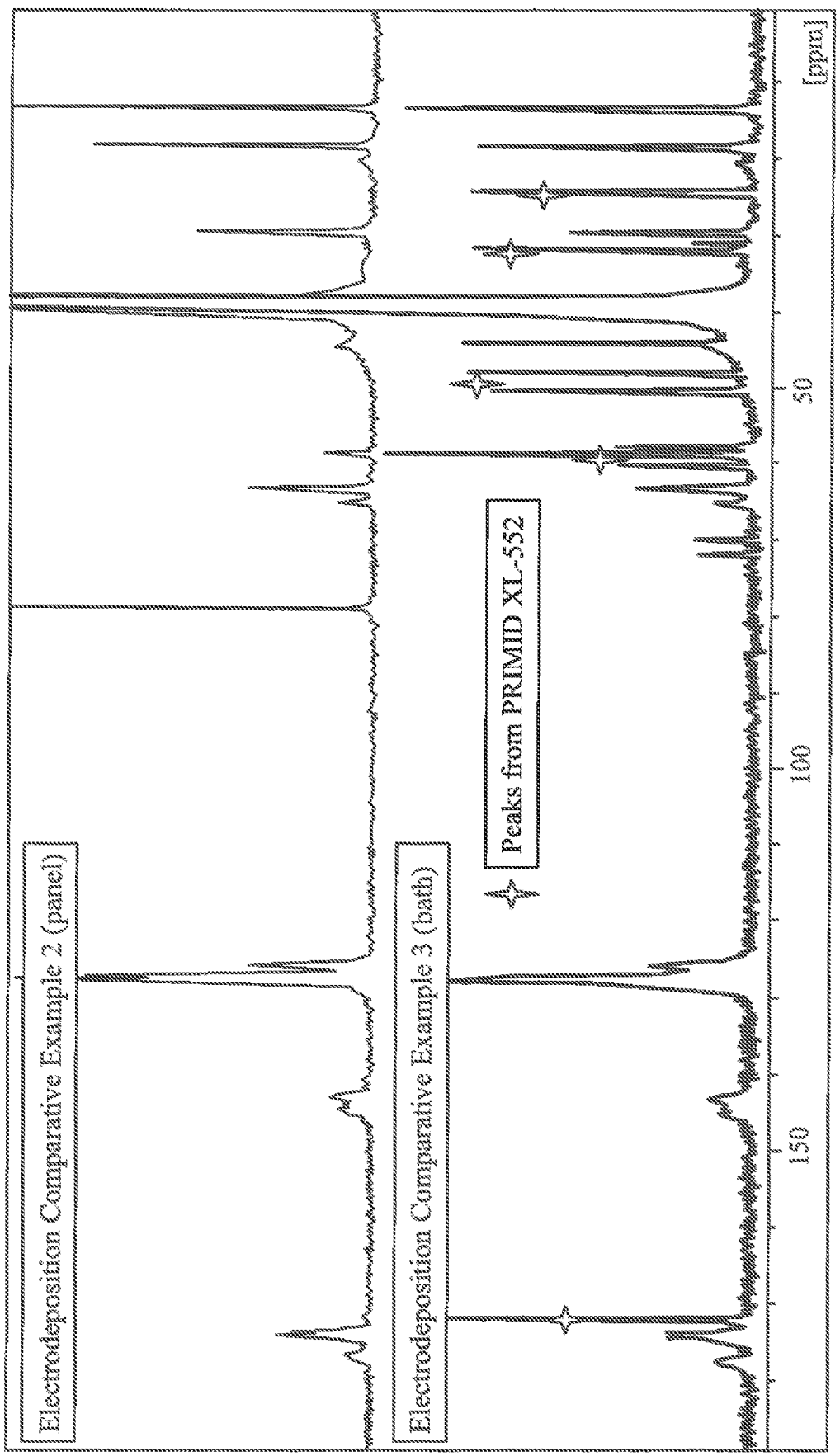

The results for electrodeposition example 1 and electrodeposition comparative examples 1 to 3 are shown in FIGS. 1 to 3.

The results show that PRIMID XL 552 was not coated out onto the steel panel (see FIG. 3). As shown in FIG. 3, PRIMID XL 552, which can be observed in the bath sample, was not observed on the panel sample. This is because analysis of the $^{13}$C-NMR spectrum of the coating composition from electrodeposition comparative example 2 revealed no peaks associated with the HAA functionality, indicating that PRIMID XL-552 did not electrodeposit with anionic acrylic resin 1 (see FIG. 3).

The results also confirmed the incorporation of polyhydroxyalkylamide (polyHAA) example 4 onto the panel. In FIG. 1, it can be seen that electrodeposition example 1 contained more acrylic components (from polyhydroxyalkylamide (polyHAA) example 4) than the comparative examples. In addition, as shown in FIG. 2, $^{13}$C NMR showed distinctive peaks corresponding to the amide carbonyl carbon and methylene carbons of the 2-hydroxyethyl substituents of polyhydroxyalkylamide (polyHAA) example 4. This demonstrated that polyhydroxyalkylamide (polyHAA) example 4 deposited onto the panel along with anionic acrylic resin 1 in electrodeposition example 1.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polyhydroxyalkylamide material having the formula (I):

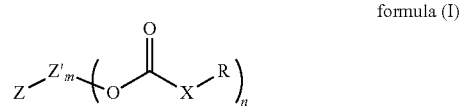

formula (I)

wherein Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2.

2. The polyhydroxyalkylamide material according to claim 1, wherein the polymer is an acrylic polymer derived from monomers having ethylenic unsaturation.

3. The polyhydroxyalkylamide material according to claim 2, wherein the monomers having ethylenic unsaturation comprise glycidyl methacrylate.

4. The polyhydroxyalkylamide material according to claim 2, wherein Z' is substituted by an oxygen atom and a carbonyl group such that the polyhydroxyalkylamide material is represented by the formula (II):

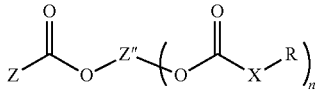

formula (II)

wherein Z represents an acrylic polymer derived from monomers having ethylenic unsaturation;

Z" represents an alkylene, alkenylene, alkynylene, aralkylene or arylene group;

X represents a bivalent organic bridging group; and n is at least 2.

5. The polyhydroxyalkylamide material according to claim 1, wherein Z is derived from a material having one or more epoxy group(s).

6. The polyhydroxyalkylamide material according to claim 1, wherein R is according to formula (IV):

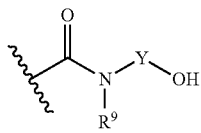

formula (IV)

such that the polyhydroxyalkylamide material is represented by the formula (V):

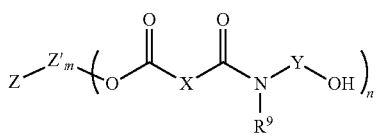

formula (V)

wherein Z represents a polymer or an alkylene, alkenylene, alkynylene or arylene group;

Z' represents a bivalent organic linking group;

m is 0 or 1;

X represents a bivalent organic bridging group;

$R^9$ represents hydrogen, an alkyl, alkenyl, alkynyl or aryl group, or —Y—OH;

each Y independently represents an alkylene, alkenylene, alkynylene or arylene linking group; and n is at least 2.

7. The polyhydroxyalkylamide material according to claim 6, wherein $R^9$ is hydrogen or methyl and Y is ethylene.

8. The polyhydroxyalkylamide material according to claim 6, wherein when $R^9$ is a methyl group and X is an alkylene group, $R^9$ together with one or more atom(s) of X forms a cyclic group such that the polyhydroxyalkylamide material is represented by the formula (VII):

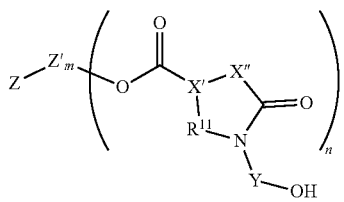

formula (VII)

wherein Z represents a polymer or an alkylene, alkenylene, alkynylene or arylene group;

Z' represents a bivalent organic linking group;

m is 0 or 1;

$R^{11}$ is the bivalent radical of $R^9$ and represents a methylene group;

X' is a fragment of X and represents —$CR^{11}$-, wherein $R^{11}$ represents hydrogen or a $C_1$ to $C_9$ alkyl group;

X" is the remaining fragment of X and represents a $C_0$ to $C_8$ alkylene group; and n is at least 2.

9. A coating composition, the coating composition comprising:

a) a film-forming resin; and b) a polyhydroxyalkylamide material having the formula (I):

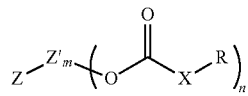

formula (I)

wherein Z represents polymer or an alkylene, alkenylene, alkynylene or arylene group;

Z' represents a bivalent organic linking group;

m is 0 or 1;

X represents a bivalent organic bridging group;

R represents a hydroxyalkylamide group; and n is at least 2.

10. The coating composition according to claim 9, wherein the film-forming resin comprises a solution polymerised acrylic resin and an emulsion polymerised acrylic resin.

11. The coating composition according to claim 9, wherein the coating composition comprises a further crosslinking material, the further crosslinking material comprising a phenolic resin.

12. A substrate at least partially coated with a coating, the coating being derived from the coating composition of claim 9.

13. A package coated on at least a portion thereof with a coating, the coating being derived from the coating composition of claim 9.

14. A method of preparing the polyhydroxyalkylamide material of claim 1 comprising:

reacting an acrylic pre-polymer derived from monomers having ethylenic unsaturation, said acrylic pre-polymer having at least two epoxy group(s), and/or a diepoxide with the reaction product of a diacid and an alkanolamine.

15. A coating composition, the coating composition comprising a polyhydroxyalkylamide material having the formula (I):

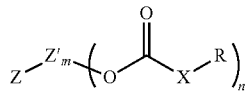
formula (I)
wherein Z represents a polymer derived from monomers having ethylenic unsaturation, and wherein Z has acid functionality;
Z' represents a bivalent organic linking group;
m is 0 or 1;
X represents a bivalent organic bridging group;
R represents a hydroxyalkylamide group; and
n is at least 2.
* * * * *